US010693574B2

(12) United States Patent
Wu et al.

(10) Patent No.: US 10,693,574 B2
(45) Date of Patent: Jun. 23, 2020

(54) METHOD AND APPARATUS FOR EFFICIENT DATA TRANSMISSIONS IN HALF-DUPLEX COMMUNICATION SYSTEMS WITH LARGE PROPAGATION DELAYS

(71) Applicant: QUALCOMM Incorporated, San Diego, CA (US)

(72) Inventors: Qiang Wu, San Diego, CA (US); Peter John Black, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 15/190,601

(22) Filed: Jun. 23, 2016

(65) Prior Publication Data
US 2017/0005741 A1   Jan. 5, 2017

Related U.S. Application Data

(60) Provisional application No. 62/188,317, filed on Jul. 2, 2015.

(51) Int. Cl.
*H04B 17/364* (2015.01)
*H04B 7/204* (2006.01)
(Continued)

(52) U.S. Cl.
CPC ........... *H04B 17/364* (2015.01); *H04B 7/185* (2013.01); *H04B 7/2041* (2013.01); *H04L 5/14* (2013.01); *H04W 24/08* (2013.01)

(58) Field of Classification Search
CPC .... H04B 17/364; H04B 7/185; H04B 7/2041; H04L 5/14; H04W 24/08
See application file for complete search history.

(56) References Cited

U.S. PATENT DOCUMENTS 3,922,496 A    11/1975  Gabbard et al.
6,137,441 A *  10/2000  Dai ............................ G01S 5/12
                                                       342/357.64
(Continued)

FOREIGN PATENT DOCUMENTS

CN         1378761 A    11/2002
CN       101572577 A    11/2009
(Continued)

OTHER PUBLICATIONS

International Search Report and Written Opinion—PCT/US2016/039795—ISA/EPO—dated Jan 12, 2017.
(Continued)

*Primary Examiner* — Saad A. Waqas
(74) *Attorney, Agent, or Firm* — Muncy, Geissler, Olds & Lowe, P.C.

(57) ABSTRACT

Methods and apparatus for efficient transmission of data by half-duplex transceivers in satellite communication systems are provided. Time reference for the return link is skewed or time-lagged relative to the time reference for the forward link to reduce the amount of guard time required to separate return link transmission from forward link reception by the half-duplex transceiver of a user terminal. The guard time is determined based on a maximum differential round-trip propagation delay and transition times of the half-duplexer transceiver to switch between transmit and receive modes. In a satellite communication system in which a large number of active user terminals are present in a beam coverage, random time offsets are applied to spread approximately equal traffic loads across the time offsets.

9 Claims, 17 Drawing Sheets

(51) Int. Cl.
*H04B 7/185* (2006.01)
*H04L 5/14* (2006.01)
*H04W 24/08* (2009.01)

(56) References Cited

U.S. PATENT DOCUMENTS

| | | | |
|---|---|---|---|
| 6,332,069 B1 * | 12/2001 | Zhao | H04B 7/2041 455/12.1 |
| 6,553,225 B1 * | 4/2003 | Zhao | H04B 7/2041 370/348 |
| 6,725,034 B1 * | 4/2004 | Diris | H04B 7/1855 455/12.1 |
| 2002/0168973 A1 | 11/2002 | Dent et al. | |
| 2003/0026215 A1 | 2/2003 | Schafer | |
| 2009/0122731 A1 | 5/2009 | Montojo et al. | |
| 2010/0085901 A1 | 4/2010 | Womack et al. | |
| 2010/0260076 A1 * | 10/2010 | Corman | H01Q 3/26 370/277 |
| 2011/0019597 A1 | 1/2011 | Moon et al. | |
| 2011/0176483 A1 * | 7/2011 | Palanki | H04W 56/0015 370/328 |
| 2012/0099558 A1 | 4/2012 | Skov et al. | |
| 2015/0085834 A1 | 3/2015 | Liu et al. | |

FOREIGN PATENT DOCUMENTS

| | | |
|---|---|---|
| CN | 101895331 A | 11/2010 |
| EP | 0935351 A1 | 8/1999 |
| WO | 2009035399 A1 | 3/2009 |
| WO | 2015047917 A1 | 4/2015 |

OTHER PUBLICATIONS

Partial International Search Report—PCT/US2016/039795—ISA/EPO—dated Sep. 29, 2016.
European Search Report—EP19177374—Search Authority—The Hague—dated Sep. 4, 2019.
European Search Report—EP19177380—Search Authority—The Hague—dated Sep. 9, 2019.

* cited by examiner

METHOD AND APPARATUS FOR EFFICIENT DATA TRANSMISSIONS IN HALF-DUPLEX COMMUNICATION SYSTEMS WITH LARGE PROPAGATION DELAYS

CROSS-REFERENCE TO RELATED APPLICATIONS

The present application for patent claims the benefit of U.S. Provisional Application No. 62/188,317, entitled "METHOD AND APPARATUS FOR EFFICIENT DATA TRANSMISSIONS IN HALF-DUPLEX COMMUNICATION SYSTEMS WITH LARGE PROPAGATION DELAYS," filed Jul. 2, 2015, assigned to the assignee hereof, and expressly incorporated herein by reference in its entirety.

INTRODUCTION

Various aspects described herein relate to communication systems, and more particularly, to data transmissions in half-duplex communication systems with large propagation delays.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the Internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beamforming antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Satellite communication systems typically experience large propagation delays between satellites and ground stations, including user terminals (UTs) and gateways, due to the distances between satellites and ground stations. Some satellite communication systems employ frequency division duplex (FDD), which would theoretically allow a transceiver of a ground station to receive and transmit simultaneously on different radio frequencies if they are sufficiently spaced apart. In some FDD satellite communication systems, however, frequency spacing between a receive frequency band and a transmit frequency band for the FDD transceiver of a given ground station may be small because frequency bands come at a premium price. In some instances, the receive and transmit frequencies for a given ground station may be too close for a duplexer to handle simultaneous reception and transmission of radio signals without interference with one another.

In a typical FDD communication system in which the receive and transmit frequency bands are close to one another, half-duplex reception and transmission schemes have been utilized with a guard time between a reception and a transmission to avoid interference between the receive and transmit signals. At a given ground station, a half-duplex transceiver may be implemented both to receive and to transmit radio signals but not at the same time. For example, a UT in a satellite communication network may receive forward link (FL) signals from a satellite and transmit return link (RL) signals to the satellite in designated time slots or subframes of a given half-duplex (HD) frame, with a specific amount of guard time between the subframe for the FL and the subframe for the RL.

In a conventional half-duplex system, a large amount of guard time is typically provided to ensure sufficient separation of time between a reception and a transmission. Because no information-carrying signal can be received or transmitted during the guard time, a large amount of guard time in each HD frame results in wasted overhead and inefficiency. Therefore, it is desirable to reduce the guard time overhead and to improve efficiency in half-duplex communication systems.

SUMMARY

Aspects of the disclosure are directed to apparatus and methods for efficient data transmission in half-duplex communication systems with large propagation delays.

In one aspect, a method of determining a time lag of a return link time reference relative to a forward link time reference in a satellite communication system is provided. The method comprises: determining a minimum round-trip propagation delay of signals between a ground station and a satellite; determining a transition time for a half-duplex transceiver of the ground station to switch between a transmit mode and a receive mode; determining a system parameter based on the transition time for the half-duplex transceiver to switch between the transmit mode and the receive mode; and determining the time lag of the return link time reference relative to the forward link time reference based on the minimum round-trip propagation delay and the system parameter.

In another aspect an apparatus configured to determine a time lag of a return link time reference relative to a forward link time reference in a satellite communication system is provided. The apparatus comprises at least one processor; and at least one memory coupled to the at least one processor, the at least one processor and the at least one memory being configured to: determine a minimum round-trip propagation delay of signals between a ground station and a satellite; determine a transition time for a half-duplex transceiver of the ground station to switch between a transmit mode and a receive mode; determine a system parameter based on the transition time for the half-duplex transceiver to switch between the transmit mode and the receive mode; and determine the time lag of the return link time reference relative to the forward link time reference based on the minimum round-trip propagation delay and the system parameter.

In another aspect an apparatus for determining a time lag of a return link time reference relative to a forward link time reference in a satellite communication system is provided. The apparatus comprises: means for determining a minimum round-trip propagation delay of signals between a ground station and a satellite; means for determining a transition time for a half-duplex transceiver at the ground station to switch between a transmit mode and a receive mode; means for determining a system parameter based on the transition time for the half-duplex transceiver to switch between the transmit mode and the receive mode; and means for determining the time lag of the return link time reference relative to the forward link time reference based on the minimum round-trip propagation delay and the system parameter.

In another aspect a computer-readable medium comprising at least one instruction for causing a computer or processor to perform a method to determine a time lag of a return link time reference relative to a forward link time reference in a satellite communication system is provided. The at least one instruction comprises instructions to: determine a minimum round-trip propagation delay of signals between a ground station and a satellite; determine a transition time for a half-duplex transceiver of the ground station to switch between a transmit mode and a receive mode; determine a system parameter based on the transition time for the half-duplex transceiver to switch between the transmit mode and the receive mode; and determine the time lag of the return link time reference relative to the forward link time reference based on the minimum round-trip propagation delay and the system parameter.

In another aspect, a method of determining a guard time between reception and transmission in a half-duplex transceiver is provided. The method comprises: determining a maximum round-trip propagation delay of signals between the half-duplex transceiver and a satellite; determining a minimum round-trip propagation delay of signals between the half-duplex transceiver and the satellite; determining a maximum differential round-trip propagation delay based on the maximum round-trip propagation delay and the minimum round-trip propagation delay; determining a transition time for the half-duplex transceiver to switch between a transmit mode and a receive mode; and determining the guard time based on the maximum differential round-trip propagation delay and the transition time for the half-duplex transceiver to switch between the transmit mode and the receive mode.

In another aspect an apparatus configured to determine a guard time between reception and transmission in a half-duplex transceiver is provided. The apparatus comprises at least one processor; and at least one memory coupled to the at least one processor, the at least one processor and the at least one memory being configured to: determine a maximum round-trip propagation delay of signals between the half-duplex transceiver and a satellite; determine a minimum round-trip propagation delay of signals between the half-duplex transceiver and the satellite; determine a maximum differential round-trip propagation delay based on the maximum round-trip propagation delay and the minimum round-trip propagation delay; determine a transition time for the half-duplex transceiver to switch between a transmit mode and a receive mode; and determine the guard time based on the maximum differential round-trip propagation delay and the transition time for the half-duplex transceiver to switch between the transmit mode and the receive mode.

In another aspect an apparatus for determining a guard time between reception and transmission in a half-duplex transceiver is provided. The apparatus comprises: means for determining a maximum round-trip propagation delay of signals between the half-duplex transceiver and a satellite; means for determining a minimum round-trip propagation delay of signals between the half-duplex transceiver and the satellite; means for determining a maximum differential round-trip propagation delay based on the maximum round-trip propagation delay and the minimum round-trip propagation delay; means for determining a transition time for the half-duplex transceiver to switch between a transmit mode and a receive mode; and means for determining the guard time based on the maximum differential round-trip propagation delay and the transition time for the half-duplex transceiver to switch between the transmit mode and the receive mode In another aspect a computer-readable medium comprising at least one instruction for causing a computer or processor to perform a method to determine a guard time between reception and transmission in a half-duplex transceiver is provided. The at least one instruction comprises instructions to: determine a maximum round-trip propagation delay of signals between the half-duplex transceiver and a satellite; determine a minimum round-trip propagation delay of signals between the half-duplex transceiver and the satellite; determine a maximum differential round-trip propagation delay based on the maximum round-trip propagation delay and the minimum round-trip propagation delay; determine a transition time for the half-duplex transceiver to switch between a transmit mode and a receive mode; and determine the guard time based on the maximum differential round-trip propagation delay and the transition time for the half-duplex transceiver to switch between the transmit mode and the receive mode.

In another aspect, a method of determining a forward link time duration and a guard time duration in a half-duplex frame is provided. The method comprises: allocating a forward link time segment in a special subframe of the half-duplex frame; allocating a guard time segment in the special subframe; determining the forward link time duration in the half-duplex frame based on the forward link time segment in the special subframe; and determining the guard time duration in the half-duplex frame based on the guard time segment in the special subframe.

In another aspect an apparatus configured to determine a forward link time duration and a guard time duration in a half-duplex frame in a satellite communication system is provide. The apparatus comprises: at least one processor; and at least one memory coupled to the at least one processor, the at least one processor and the at least one memory being configured to: allocate a forward link time segment in a special subframe of the half-duplex frame; allocate a guard time segment in the special subframe; determine the forward link time duration in the half-duplex frame based on the forward link time segment in the special subframe; and determine the guard time duration in the half-duplex frame based on the guard time segment in the special subframe.

In another aspect an apparatus for determining a forward link time duration and a guard time duration in a half-duplex frame in a satellite communication system is provided. The apparatus comprises: means for allocating a forward link time segment in a special subframe of the half-duplex frame; means for allocating a guard time segment in the special subframe; means for determining the forward link time duration in the half-duplex frame based on the forward link time segment in the special subframe; and means for determining the guard time duration in the half-duplex frame based on the guard time segment in the special subframe.

In another aspect a computer-readable medium comprising at least one instruction for causing a computer or processor to perform a method to determine a forward link time duration and a guard time duration in a half-duplex frame in a satellite communication system is provided. The at least one instruction comprises instructions to: allocate a forward link time segment in a special subframe of the half-duplex frame; allocate a guard time segment in the special subframe; determine the forward link time duration in the half-duplex frame based on the forward link time segment in the special subframe; and determine the guard time duration in the half-duplex frame based on the guard time segment in the special subframe In another aspect, a method of scheduling time offsets of a plurality of user terminals in a beam coverage of a satellite in a satellite communication system is provided. The method comprises: determining a number of time offsets based on a number of active user terminals in the beam coverage; assigning equally spaced time offsets based on the number of time offsets; determining whether aggregate patterns for the active user terminals in the beam coverage have random offsets; and spreading approximately equal traffic loads across times for the active user terminals.

In another aspect an apparatus configured to schedule time offsets of a plurality of user terminals in a beam coverage of a satellite in a satellite communication system is provided. The apparatus comprises: at least one processor; and at least one memory coupled to the at least one processor, the at least one processor and the at least one memory being configured to: determine a number of time offsets based on a number of active user terminals in the beam coverage; assign equally spaced time offsets based on the number of time offsets; determine whether aggregate patterns for the active user terminals in the beam coverage have random offsets; and spread approximately equal traffic loads across times for the active user terminals.

In another aspect an apparatus for scheduling time offsets of a plurality of user terminals in a beam coverage of a satellite in a satellite communication system is provided. The apparatus comprises: means for determining a number of time offsets based on a number of active user terminals in the beam coverage; means for assigning equally spaced time offsets based on the number of time offsets; means for determining whether aggregate patterns for the active user terminals in the beam coverage have random offsets; and means for spreading approximately equal traffic loads across times for the active user terminals.

In another aspect a computer-readable medium comprising at least one instruction for causing a computer or processor to perform a method to schedule time offsets of a plurality of user terminals in a beam coverage of a satellite in a satellite communication system is provided. The at least one instruction comprises instructions to: determine a number of time offsets based on a number of active user terminals in the beam coverage; assign equally spaced time offsets based on the number of time offsets; determine whether aggregate patterns for the active user terminals in the beam coverage have random offsets; and spread approximately equal traffic loads across times for the active user terminals.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
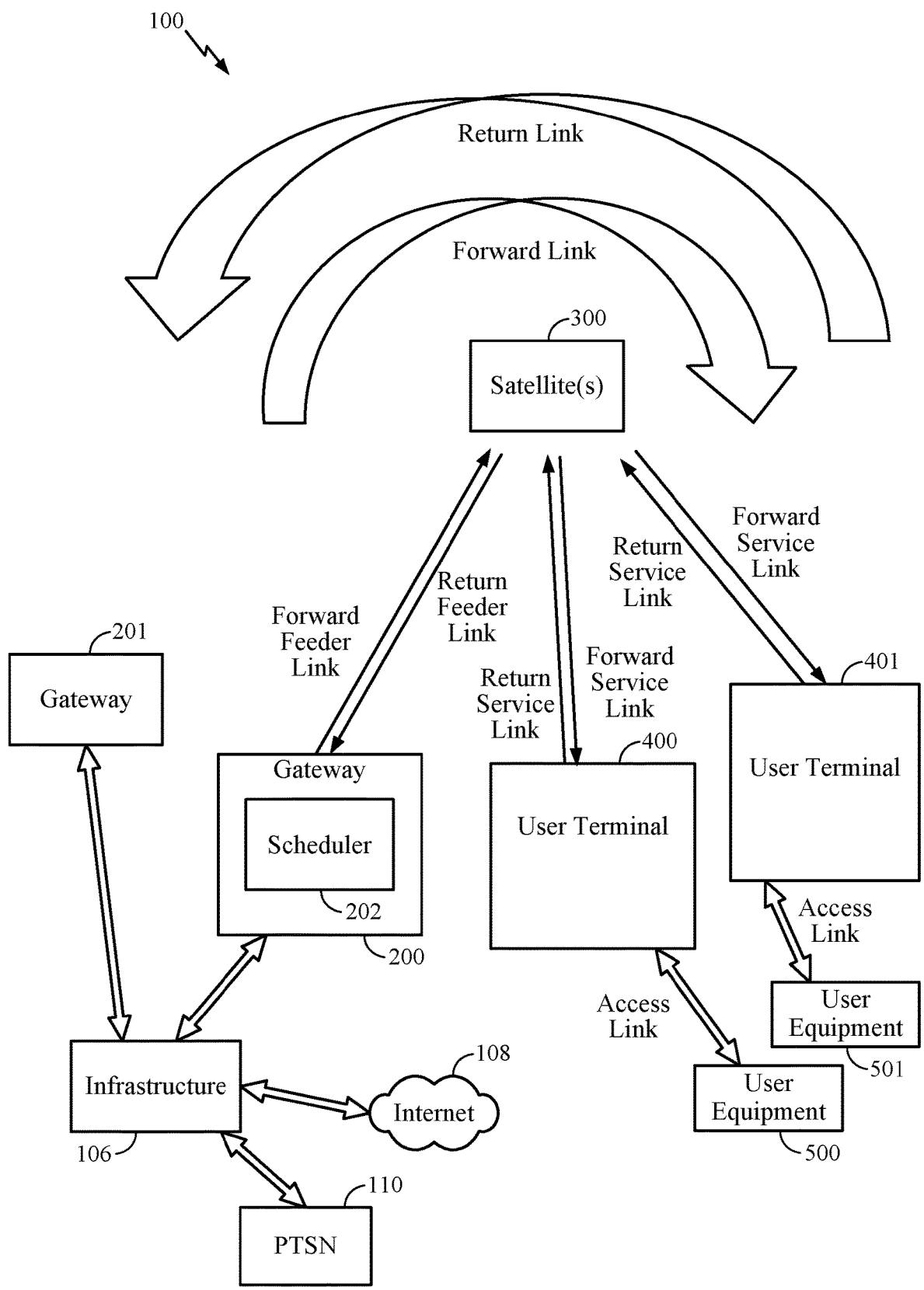
FIG. 1 is a block diagram of an example of a communication system.

Various aspects of the disclosure relate to methods and apparatus for time or frequency synchronization of radio signals transmitted by user terminals (UTs) in communication with a gateway through a satellite in a non-geosynchronous satellite communication system, such as a low-earth orbit (LEO) satellite communication system for data, voice or video communications. In one aspect, times of transmission of radio signals from the user terminals may be adjusted such that the signals arrive at the gateway at the same time or with time-of-arrival differentials within a specified tolerance. In another aspect, carrier frequencies of radio signals transmitted from the user terminals may be adjusted such that frequency offset differentials, including but not limited to Doppler offset differentials, at the gateway are eliminated or at least reduced to an amount within a specified tolerance. In one aspect, an open loop pre-correction is provided to generate pre-correction values for the time or frequency, which may be applied to adjust the transmission times to equalize propagation delays or to adjust the carrier frequencies to eliminate or to reduce frequency offset differentials. In another aspect, a closed loop pre-correction is provided in addition to the open loop pre-correction to provide more accurate correction values for the time or frequency. In yet another aspect, a satellite communication system may have a large number of active user terminals that are present in a beam coverage. Random time offsets can be applied by a scheduler to spread approximately equal traffic loads across the time offsets. Various other aspects of the disclosure will also be described below in further detail.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. In one aspect, the gateway 200 includes a scheduler 202, which may be an adaptive special subframe (SSF) scheduler and/or a random offset scheduler, for example. Details regarding the scheduler 202 and related functionality are provided in subsequent paragraphs and figures. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with the UT 400 and/or UT 401. Alternatively, a UT and a corresponding UE may be integral parts of a single physical device, such as a mobile telephone with an integral satellite transceiver and an antenna for communicating directly with a satellite, for example. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, the PSTN 110, or one or more other types of public, semiprivate or private networks without using the infrastructure 106. Still further, the gateway 200 may communicate with other gateways, such as a gateway 201 through the infrastructure 106 or alternatively may be configured to communicate to the gateway 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Link (FL)" whereas the signal path from the satellite 300 to the gateway 200 is labeled "Return Link (RL)" in FIG. 1. In a similar manner, the signal path from each UT 400 or 401 to the satellite 300 is labeled "Return Link (RL)" whereas the signal path from the satellite 300 to each UT 400 or 401 is labeled "Forward Link (FL)" in FIG. 1.

Figure 2:
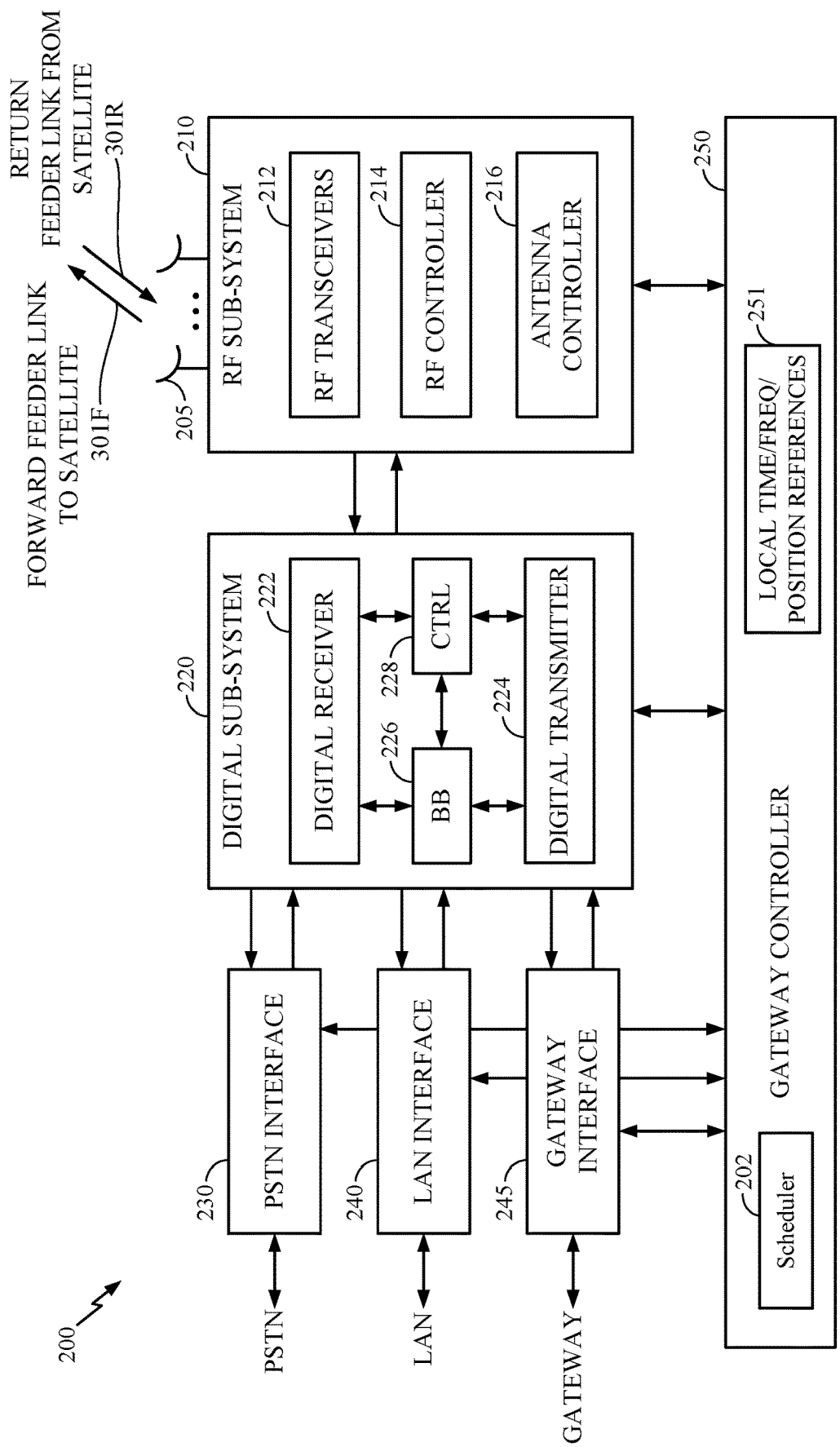
FIG. 2 is a block diagram of an example of the gateway of FIG. 1.

FIG. 2 is an example block diagram of the gateway 200, which also can apply to the gateway 201 of FIG. 1. The gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. The RF subsystem 210 is coupled to the antennas 205 and to the digital subsystem 220. The digital subsystem 220 is coupled to the PSTN interface 230, the LAN interface 240, and to the gateway interface 245. The gateway controller 250 is coupled to the RF subsystem 210, the digital subsystem 220, the PSTN interface 230, the LAN interface 240, and the gateway interface 245.

The RF subsystem 210, which may include a number of RF transceivers 212, an RF controller 214, and an antenna controller 216, may transmit communication signals to the satellite 300 via a forward link (FL) 301F, and may receive communication signals from the satellite 300 via a return link (RL) 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of the RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communications between the gateway 200 and the UT 400. One of the receive chains of the RF transceivers 212 may provide input signals to multiple digital receiver modules 222. A number of the digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder module. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control (CTRL) processor 228, which is coupled to the digital receiver modules 222, the digital transmitter modules 224, and the BB processor 226, may provide command and control signals to effect functions such as, but not limited to, signal processing, timing signal generation, power control, handoff control, diversity combining, and system interfacing.

The CTRL processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband (BB) processor 226 is well known in the art and is therefore not described in detail herein. For example, the BB processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the gateway 200 to a ground-based network (e.g., the Internet 108).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, the gateway interface 245 may communicate with other gateways via one or more dedicated communication lines or channels (not shown for simplicity). For other implementations, the gateway interface 245 may communicate with other gateways using the PSTN 110 and/or other networks such as the Internet 108 (see also FIG. 1). For at least one implementation, the gateway interface 245 may communicate with other gateways via the infrastructure 106.

Overall gateway control may be provided by the gateway controller 250. The gateway controller 250 may plan and control utilization of the satellite 300's resources by the gateway 200. For example, the gateway controller 250 may analyze trends, generate traffic plans, allocate satellite resources, monitor (or track) satellite positions, and monitor the performance of the gateway 200 and/or the satellite 300. The gateway controller 250 may also be coupled to a ground-based satellite controller (not shown for simplicity) that maintains and monitors orbits of the satellite 300, relays satellite usage information to the gateway 200, tracks the positions of the satellite 300, and/or adjusts various channel settings of the satellite 300.

In the example implementation illustrated in FIG. 2, the gateway controller 250 includes a scheduler 202, which may be an adaptive special subframe (SSF) scheduler and/or a random offset scheduler. Details regarding the scheduler and related functionality are provided in subsequent paragraphs and figures (see, e.g., FIG. 13 and FIG. 14). The scheduler 202 may provide information to the RF subsystem 210, the digital subsystem 220, and/or the interfaces 230, 240, and 245. In one aspect, the information may be used in a satellite communication system having a large number of active user terminals in a beam coverage. The random time offsets are applied to spread approximately equal traffic loads across the time offsets to facilitate communication between the gateway 200 and UT 400 and UT 401, for example.

Likewise, for the example implementation illustrated in FIG. 2, the gateway controller 250 may optionally include a local time, frequency, and position references 251, which may provide local time or frequency information to the RF subsystem 210, the digital subsystem 220, and/or the interfaces 230, 240, and 245. The time or frequency information may be used to synchronize the various components of the gateway 200 with each other and/or with the satellite 300. The local time, frequency, and position references 251 may also provide position information (e.g., ephemeris data) of the satellite 300 to the various components of the gateway 200. Further, although depicted in FIG. 2 as included within the gateway controller 250, for other implementations, the local time, frequency, and position references 251 may be a separate subsystem that is coupled to the gateway controller 250 (and/or to one or more of the digital subsystem 220 and the RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with the satellite 300, for example, to retrieve ephemeris data from the satellite 300. The gateway controller 250 may also receive processed information (e.g., from the SCC and/or the NCC) that allows the gateway controller 250 to properly aim the antennas 205 (e.g., at the satellite 300), to schedule beam transmissions, to coordinate handovers, and to perform various other well-known functions.

Figure 3:
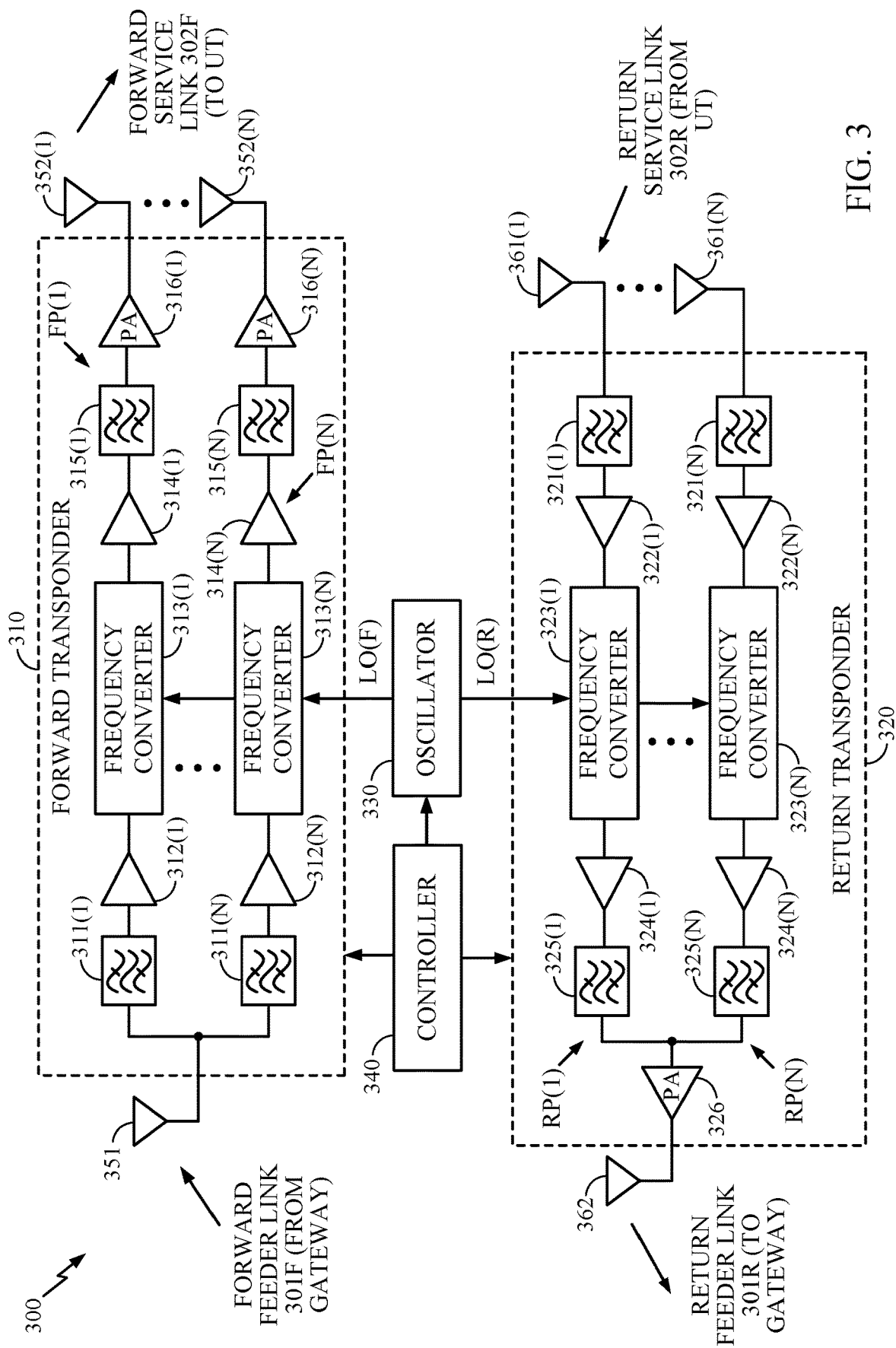
FIG. 3 is a block diagram of an example of the satellite of FIG. 1.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and the UT 400. It will be appreciated that the disclosure is not limited to any specific satellite configuration and any satellite or combinations of satellites that can provide the functional connection between the gateway 200 and the UT 400 can be considered within the scope of the disclosure. In one example, the satellite 300 is shown to include a forward transponder 310, a return transponder 320, an oscillator 330, a controller 340, forward link antennas 352(1)-352(N), and return link antennas 361(1)-361(N). The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of the antennas 352(1)-352(N).

Within each of a respective one of forward paths FP(1)-FP(N), the first bandpass filter 311(1) passes signal components having frequencies within the channel or frequency band of the respective forward paths FP(1)-FP(N), and filters signal components having frequencies outside the channel or frequency band of the respective forward paths FP(1)-FP(N). Thus, the pass band of the first bandpass filter 311(1) corresponds to the width of the channel associated with the respective forward paths FP(1)-FP(N). The first LNA 312(1) amplifies the received communication signals to a level suitable for processing by the frequency converter 313(1). The frequency converter 313(1) converts the frequency of the communication signals in the respective forward path FPs (1)-FP(N) (e.g., to a frequency suitable for transmission from the satellite 300 to the UT 400). The second LNA 314(1) amplifies the frequency-converted communication signals, and the second bandpass filter 315(1) filters signal components having frequencies outside of the associated channel width. The PA 316(1) amplifies the filtered signals to a power level suitable for transmission to the UT 400 via the respective antennas 352(1)-352(N). The return transponder 320, which includes a number N of return paths RP(1)-RP(N), receives communication signals from the UT 400 along return link (RL) 302R via the antennas 361(1)-361(N), and transmits communication signals to the gateway 200 along the RL 301R via one or more antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321(1) passes signal components having frequencies within the channel or frequency band of the respective return paths RP(1)-RP(N), and filters signal components having frequencies outside the channel or frequency band of the respective return paths RP(1)-RP(N). Thus, the pass band of the first bandpass filter 321(1) may for some implementations correspond to the width of the channel associated with the respective return paths RP(1)-RP(N). The first LNA 322(1) amplifies all the received communication signals to a level suitable for processing by the frequency converter 323(1). The frequency converter 323(1) converts the frequency of the communication signals in the respective return paths RP(1)-RP(N) (e.g., to a frequency suitable for transmission from the satellite 300 to the gateway 200). The second LNA 324(1) amplifies the frequency-converted communication signals, and the second bandpass filter 325(1) filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to frequency converters 323(1)-323(N) of the return transponder 320. For example, the LO(F) signal may be used by the frequency converters 313(1)-313(N) to convert communication signals from a frequency band associated with the transmission of signals from the gateway 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the gateway 200.

The controller 340, which is coupled to the forward transponder 310, the return transponder 320, and the oscillator 330, may control various operations of the satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
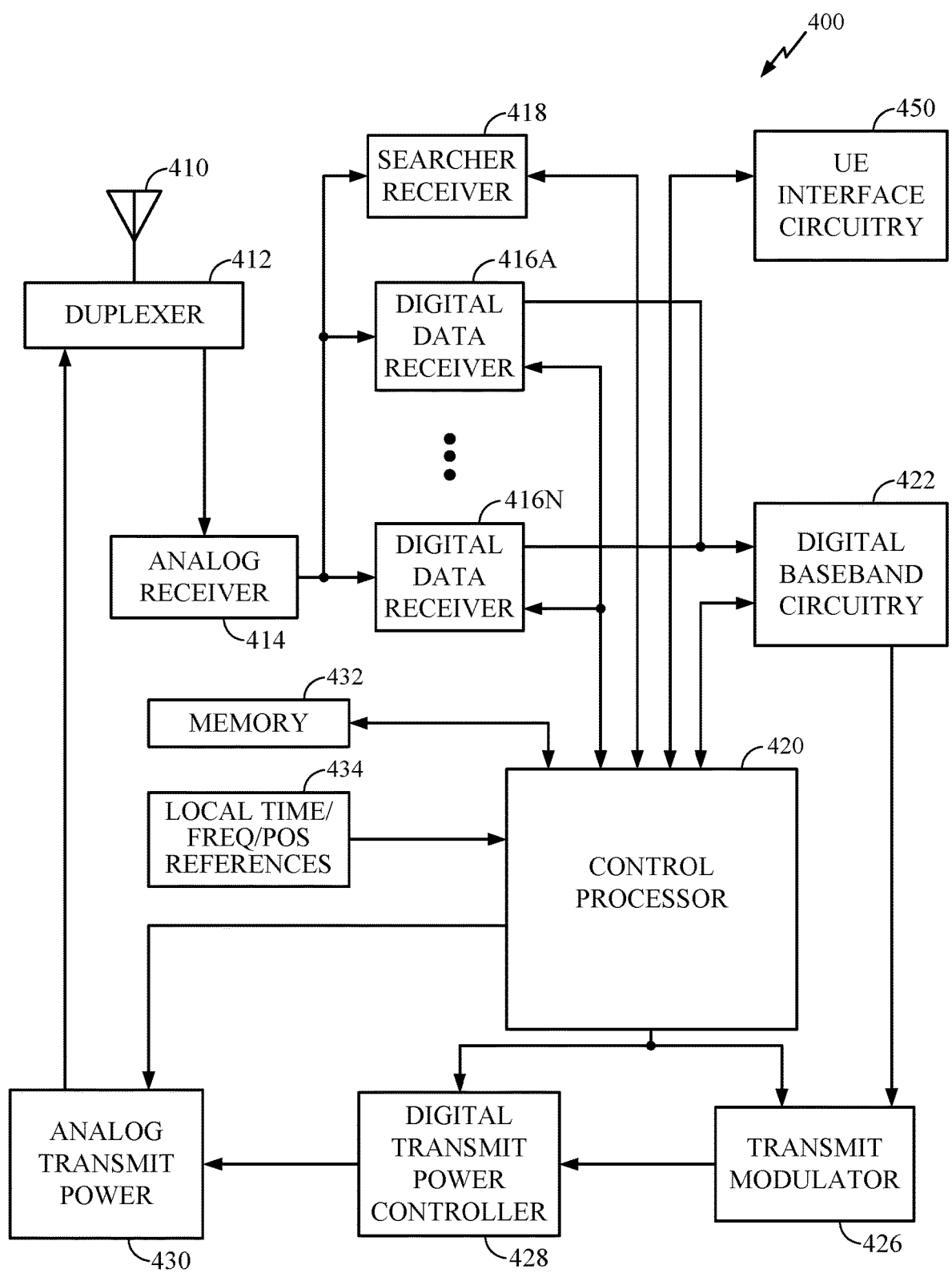
FIG. 4 is a block diagram of an example of the User Terminal of FIG. 1.

An example of a transceiver for use in the UT 400 or 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna 410 to serve both transmit and receive functions. Alternatively, the transceiver for the UT 400 or 401 may employ separate antennas 410 for operating at different transmit and receive frequencies.

The digital communication signals output by the analog receiver 414 are transferred to at least one digital data receiver 416A-416N and at least one searcher receiver 418. The digital data receivers 416A-416N can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 comprises processing and presentation elements used to transfer information to and from the UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communications signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a digital transmit power controller 428 which provides output power control to an analog transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the RL 301R to the satellite 300.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, the digital data receivers 416A-416N can be assigned to track the pilot signal after acquisition to accurately determine the ratio of signal chip energies to signal noise, and to formulate pilot signal strength. Therefore, the outputs of these digital data receivers 416A-416N can be monitored to determine the energy in, or frequency of, the pilot signal or other signals. These digital data receivers 416A-416N also employ frequency tracking elements that can be monitored to provide current frequency and timing information to the control processor 420 for signal demodulation.

The control processor 420 may use such information to determine to what extent the received signals are offset from the oscillator frequency, when scaled to the same frequency band, as appropriate. This, and other information related to frequency errors and frequency shifts, can be stored in a storage or the memory 432 as desired.

The control processor 420 may also be coupled to UE interface circuitry 450 to allow communications between the UT 400 and one or more other UEs (not shown). The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface (not shown) and/or other known communication technologies configured to communicate with one or more UEs in communication with the UT 400.

Figure 5:
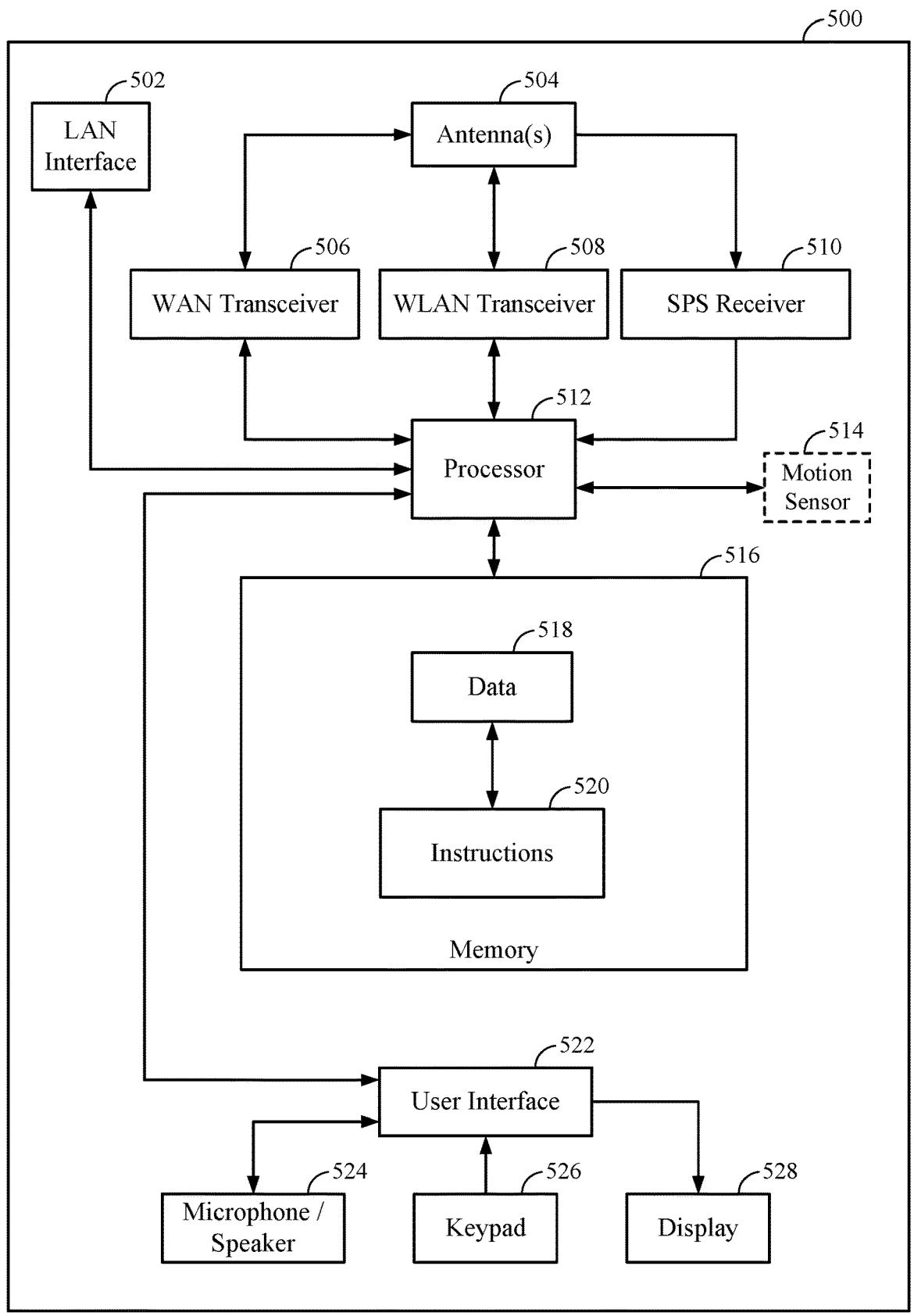
FIG. 5 is a block diagram of an example of the User Equipment of FIG. 1.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with Global Positioning System (GPS), Global Navigation Satellite System (GLONASS) and/or any other global or regional satellite based positioning system. In an alternate aspect, the UE 500 may include the WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee® and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with a user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with, but separate from, the UT 400 as illustrated in FIG. 1, for example. Alternatively, the UE 500 and the UT 400 may be integral parts of a single physical device.

In the example shown in FIG. 1, two UTs 400 and 401 may conduct two-way communications with the satellite 300 via RLs and FLs within a beam coverage. A satellite 300 may communicate with more than two UTs 400 and 401 within a beam coverage. The RL from the UTs 400 and 401 to the satellite 300 is thus a many-to-one channel. Large time delay differentials and frequency offset differentials may exist between different UTs within a beam coverage. Frequency offset differentials may be due to differences in Doppler frequency shifts experienced by the UTs 400 and 401 within a beam coverage due to the relative motions of the satellite 300 and the UTs 400 and 401, for example. Some of the UTs 400 and 401 may be mobile while others may be stationary, for example. Frequency offset differentials between different UTs 400 and 401 may also be cause by other factors, for example, frequency drifts due to radio frequency (RF) components in the transmitter chains of some of the UTs 400 and 401 in a beam coverage.

In the satellite communication system 100 illustrated in FIG. 1, multiple UTs 400 and 401 within a beam coverage may be time-division-multiplexed (TDM), frequency-division-multiplexed (FDM), or multiplexed in some other manner. Regardless of whether the multiplexing of different UTs 400 and 401 within a beam coverage is achieved by TDM, FDM, or some other type of multiplexing, the amount of one-way propagation delay, that is, the amount of time for a radio signal to travel one-way between a UT and a satellite, may be in the range of about 4 ms to about 5.2665 ms, due to the distance between the satellite and the UT.

In this example, the round-trip delay for signal propagation in the satellite communication system 100 may be as much as 10.533 ms. If the guard time between receive and transmit periods of a given UT were equal to the maximum round-trip delay, then the receive and transmit periods have to be much longer to reduce the overhead of the guard time.

In one aspect, a method and apparatus for skewing a timing reference is provided to reduce the guard time required to separate receive and transmit operations of a half-duplex transceiver of a UT. In one aspect, if the RL time reference is skewed, that is, time-lagged, relative to the FL time reference by a minimum round-trip delay (RTD) of 8 ms, for example, then the guard time required for the half-duplex transceiver is a maximum differential RTD of 2.533 ms, plus the time required for the half-duplex transceiver to transition from a receive mode to a transmit mode and from a transmit mode to a receive mode. In contrast with other schemes of efficient half-duplex FDD operations, methods and apparatus according to various aspects of this disclosure do not require discarding of any part of a symbol, for example, the cyclic prefix for an orthogonal frequency division multiplexing (OFDM) symbol.

Figure 6:
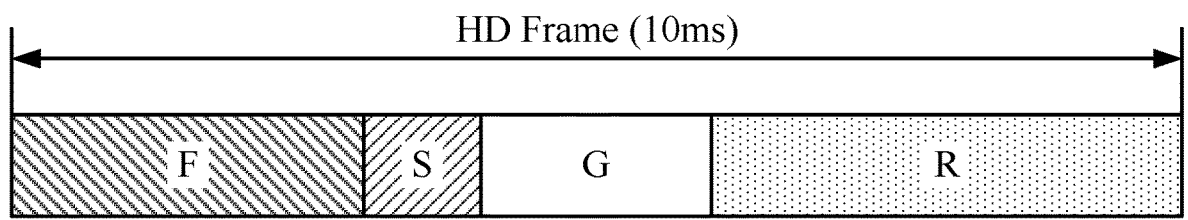
FIG. 6 is a diagram illustrating an example of a half-duplex (HD) frame.

FIG. 6 is a diagram illustrating an example of a receive/transmit pattern of a half-duplex (HD) frame for the half-duplex UT transceiver. In this example, the HD frame has a time duration of 10 ms, and includes four time segments or subframes, including "F" for FL, which is followed by "S" for special subframe (SSF), which is followed by "G" for guard time, which is followed by "R" for RL.

In one aspect, such an HD frame format including F, S, G and R subframes allows one-to-one association between FL and RL subframes due to the constraints in FL and RL hybrid automatic repeat request (HARQ) acknowledgement and RL scheduling grants. In this example, where an HD frame has a time duration of 10 ms, the time allocations for subframes F, S, G and R are 3 ms, 1 ms, 2 ms and 4 ms, respectively.

Figure 7:
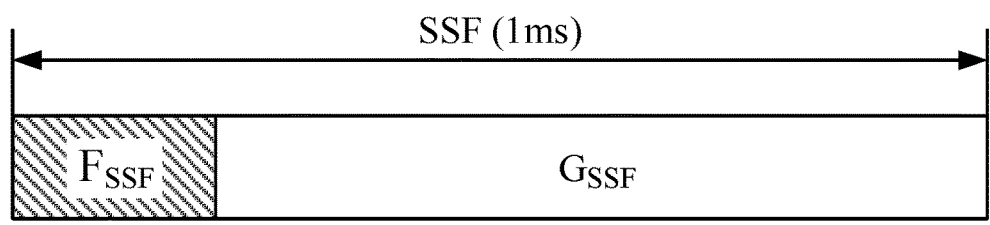
FIG. 7 is a diagram illustrating an example of a special subframe (SSF) within the HD frame of FIG. 6.

FIG. 7 is a diagram illustrating an example of a special subframe (SSF), that is, subframe S within the HD frame of FIG. 6. In one aspect, the SSF includes a first portion, that is, an FL component $F_{SSF}$ immediately following the FL subframe F as illustrated in FIG. 6, and a second portion, that is, a guard time component $G_{SSF}$ immediately preceding the guard subframe G as illustrated in FIG. 6. Within the SSF in the example illustrated in FIG. 7, the FL component $F_{SSF}$ is a time segment designated for the FL and the guard time component $G_{SSF}$ is a time segment designated for guard time.

For example, if the time duration of the HD frame is 10 ms, the SSF may have a time duration of about 1 ms, including $F_{SSF}$ having a time duration of about 0.2 ms for the FL and $G_{SSF}$ having a time duration of about 0.8 ms for the guard time. In this example, the total guard time, which is the sum of the guard time component $G_{SSF}$ within the SSF as illustrated in FIG. 7 and the guard time in subframe G as illustrated in FIG. 6, is about 2.8 ms. Likewise, the total time duration for the FL is the sum of the FL component $F_{SSF}$ within the SSF and the time duration of subframe F, which is about 3.2 ms in this example. In one aspect, the proportion of the FL component $F_{SSF}$ relative to the guard time component $G_{SSF}$ within the SSF may be dynamically adjusted as described in further detail below.

As it is apparent from FIG. 6, subframe G for the guard time needs to be much shorter in duration than the HD frame. In one aspect, the minimum guard time required in the HD frame for the half-duplex transceiver would be the maximum differential round-trip propagation delay, that is, the maximum round-trip propagation delay minus the minimum round-trip propagation delay, without accounting for additional delays due to transitions from a receive mode to a transmit mode and vice versa by the half-duplex transceiver. In the example described above, where the maximum round-trip propagation delay is about 10.533 ms and the minimum round-trip propagation delay is about 8 ms, the maximum differential round-trip propagation delay would be 10.533 ms−8 ms=2.533 ms. In one aspect, additional delays due to transitions from the receive mode to the transmit mode and vice versa by the half-duplex transceiver are added to the maximum differential round-trip propagation delay in deriving the guard time required to separate the transmission of return link signals and the reception of forward link signals.

In a typical half-duplex transceiver, it may take a finite amount of time for circuit components such as phased locked loop (PLL) and power amplifier (PA) to settle when the transceiver switches from the transmit mode to the receive mode or vice versa. In one aspect, additional time margins may be provided in the guard time to accommodate for the time required for transitions from the transmit mode to the receive mode and vice versa. For example, a typical half-duplex transceiver may require a transition time of about 100 μs from the transmit mode to the receive mode for the PLL and PA to settle. In such a typical half-duplex transceiver, the transition time from the receive mode to the transmit mode for the PLL and PA to settle is also about 100 μs.

In one aspect, the guard time required for the half-duplex transceiver at the UT is equal to the maximum differential round-trip propagation delay, plus the transition time from the receive mode to the transmit mode, plus the transition time from the transmit mode to the receive mode. In the example described above, where the maximum differential round-trip propagation delay is about 2.533 ms and the transition time for each half-duplex transition between the transmit mode and the receive mode in either direction is about 100 μs, the guard time for the half-duplex transceiver at the UT would be at least 2.533 ms+0.1 ms+0.1 ms=2.733 ms, which may be rounded up to 2.8 ms.

In one aspect, a time reference for the RL may be skewed, that is, time-lagged, relative to the time reference for the FL by a set amount in order to reduce the length of time required for the subframe G in each HD frame. In one aspect, the time reference for the RL may be skewed or time-lagged relative to the time reference for the FL by an amount approximately equal to the minimum round-trip propagation delay, that is, twice the minimum propagation delay of one-way signal travel between the UT and the satellite, minus a small adjustment to account for the transition time required by the half-duplex transceiver to switch between a transmit mode and a receive mode, which will be described in further detail below.

In one aspect, the time reference for the RL may be skewed or time-lagged relative to the time reference for the FL by an amount slightly less than the minimum round-trip propagation delay. For example, if the minimum one-way propagation delay is about 4 ms, then the time reference for the RL may be skewed by about 8 ms relative to the time reference for the FL, minus a small adjustment, which is a system parameter based on the transition time for the half-duplex transceiver to switch between the transmit mode and the receive mode.

The amount of time lag or skewing of the time reference for the RL relative to the FL may be set equal to the minimum round-trip propagation delay minus $T_{R2F}$, which is a system parameter based on the transition time required for the half-duplex transceiver to switch from the transmit mode to the receive mode. For example, if the transition time for transceiver components such as PLL and PA to settle when the half-duplex transceiver switches from the transmit mode to the receive mode or vice versa is about 100 μs, then the system parameter $T_{R2F}$ may be slightly more than 100 μs to accommodate for a margin for the transition time.

In the example described above with respect to an HD frame having a length of 10 ms and including F, S, G and R subframes, where subframe S is a special subframe (SSF) including an FL time component $F_{SSF}$ and a guard time component $G_{SSF}$, the lengths of F, S, G and R subframes are 3 ms, 1 ms, 2 ms and 4 ms, respectively, as illustrated in FIGS. 6 and 7. If the FL time component $F_{SSF}$ has a length of 0.2 ms and the guard time component $G_{SSF}$ has a length of 0.8 ms, then the total time duration allocated to the FL within the HD frame would be 3 ms+0.2 ms=3.2 ms, the total time duration allocated to guard time is 2.8 ms, and the total time duration allocated to the RL remains 4 ms, which is the length of the R subframe. In this example, the UT is able to achieve 32% of FL beam capacity, and 40% of RL beam capacity.

In one aspect, a plurality of random offsets may be utilized for half-duplex patterns of HD frames for multiple UTs in a beam coverage. In the example described above in which an HD frame has a length of 10 ms, ten equal offsets of time with an interval of 1 ms between each pair of adjacent offsets, for example, 0 ms, 1 ms, 2 ms, . . . 9 ms, may be provided for the half-duplex patterns. In one aspect, the half-duplex transceiver of a UT may monitor the FL when there is no traffic. When the FL and/or RL traffic for the UT arrives, the half-duplex pattern for that UT starts with a random offset, which may be any of the offsets from 0 ms to 9 ms. When the burst of traffic ends, the UT enters a state for FL monitoring. The next time the FL and/or RL traffic for the UT arrives, the half-duplex pattern for the UT starts with another random offset which can be different from the previous offset. For any UT in a beam coverage, the HD frame offset varies with time in a random fashion following the random arrival time of the FL and/or RL traffic.

In a satellite communication network in which a satellite beam covers a large number of UTs, at any instant of time, each of the active UTs has a half-duplex pattern with a random offset independent of the other active UTs in the beam coverage. With a large number of UTs in a beam coverage, an aggregate of half-duplex patterns may be created with random offsets. With a large number of active UTs randomly located within a beam coverage, it is expected that there would be an approximately equal number of UTs per offset, and that the traffic would be approximately evenly spread over time.

In the example described above, where ten offsets from 0 ms to 9 ms are provided, assuming that an HD frame has a length of 10 ms, each of the offsets (0 ms, 1 ms, 2 ms, . . . 9 ms) would contain a roughly equal number of UTs. If the number of active UTs in a beam coverage is relatively small, for example, fewer than 10 UTs in a beam coverage, then a number of equally spaced offsets fewer than 10 offsets, for example, a total of 5 offsets with an interval of 2 ms between each pair of adjacent offsets, that is, 0 ms, 2 ms, 4 ms, 6 ms and 8 ms, may be provided. Again, an approximately equal number of UTs is expected to be found in each of the time offsets.

In one aspect, the system time references and HARQ timelines for a communication system with half-duplex transceivers are established such that these time references and HARQ timelines are implementable by a scheduler (e.g., scheduler 202), which may be located in either the gateway or the infrastructure, for UTs operating with a full-duplex physical layer. In one aspect, the forward link HARQ and the return link HARQ acknowledgement rules in the satellite time reference for half-duplex operations may be determined. In one aspect, these forward link and return link HARQ timing rules are constraints that the half-duplex scheduler needs to comply with.

In one aspect, the satellite 300 acts as a transponder between the gateway 200 and the UTs 400 and 401 within a beam coverage of the satellite 300 in the example illustrated in FIG. 1. In one aspect, the time reference for the satellite RL receiver is skewed or time-lagged by an amount of time equal to the minimum round-trip propagation delay minus $T_{R2F}$, which is a system parameter that is dependent on the transition time for transceiver circuit components such as PLL and PA to settle during a transition from the transmit mode to the receive mode or vice versa, as described above, relative to the time reference for the satellite FL transmitter.

Figure 8:
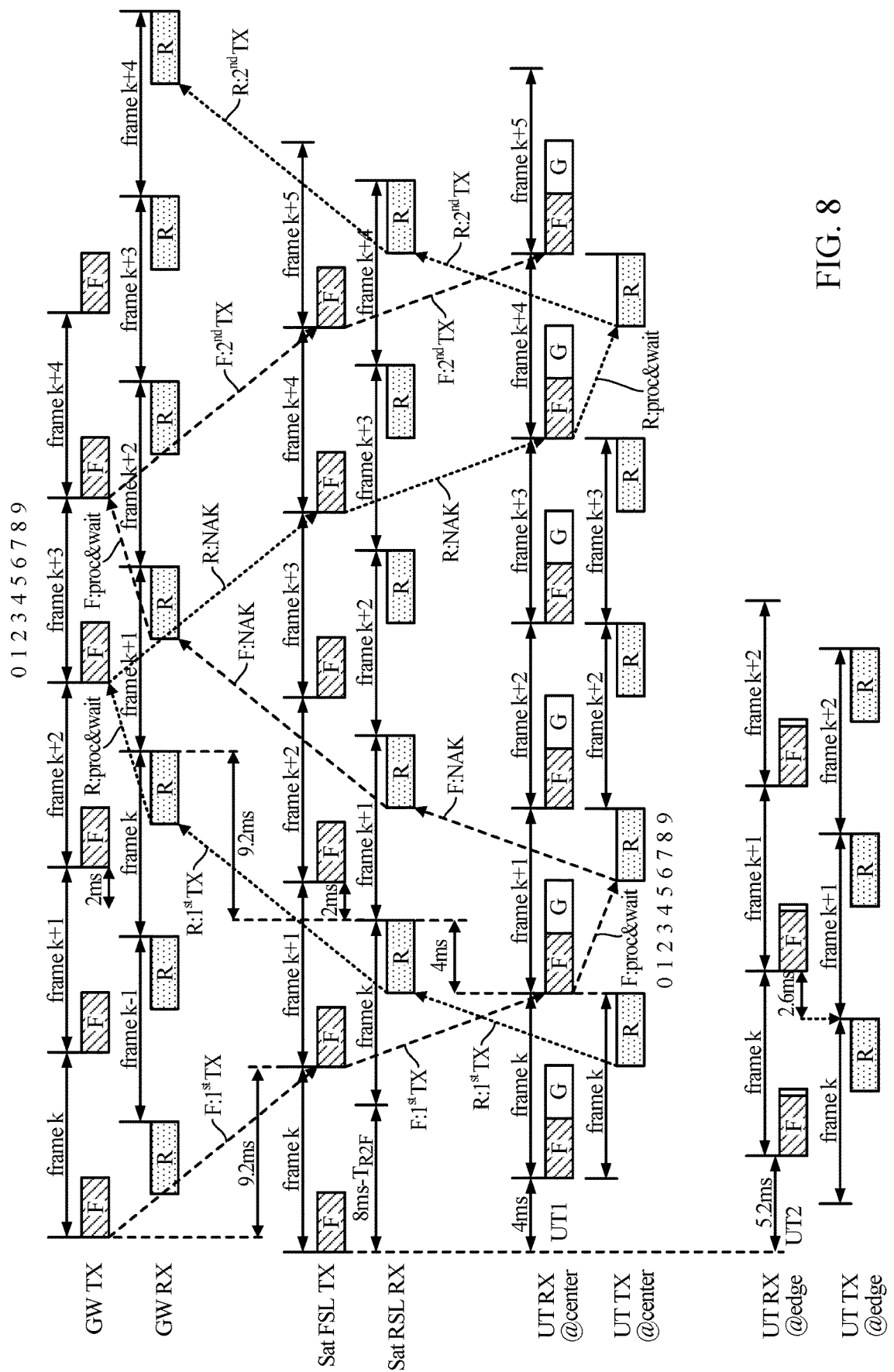
FIG. 8 is a diagram illustrating an example of a hybrid automatic repeat request (HARQ) timeline with a feeder link delay of about 9.2 ms.
Figure 9:
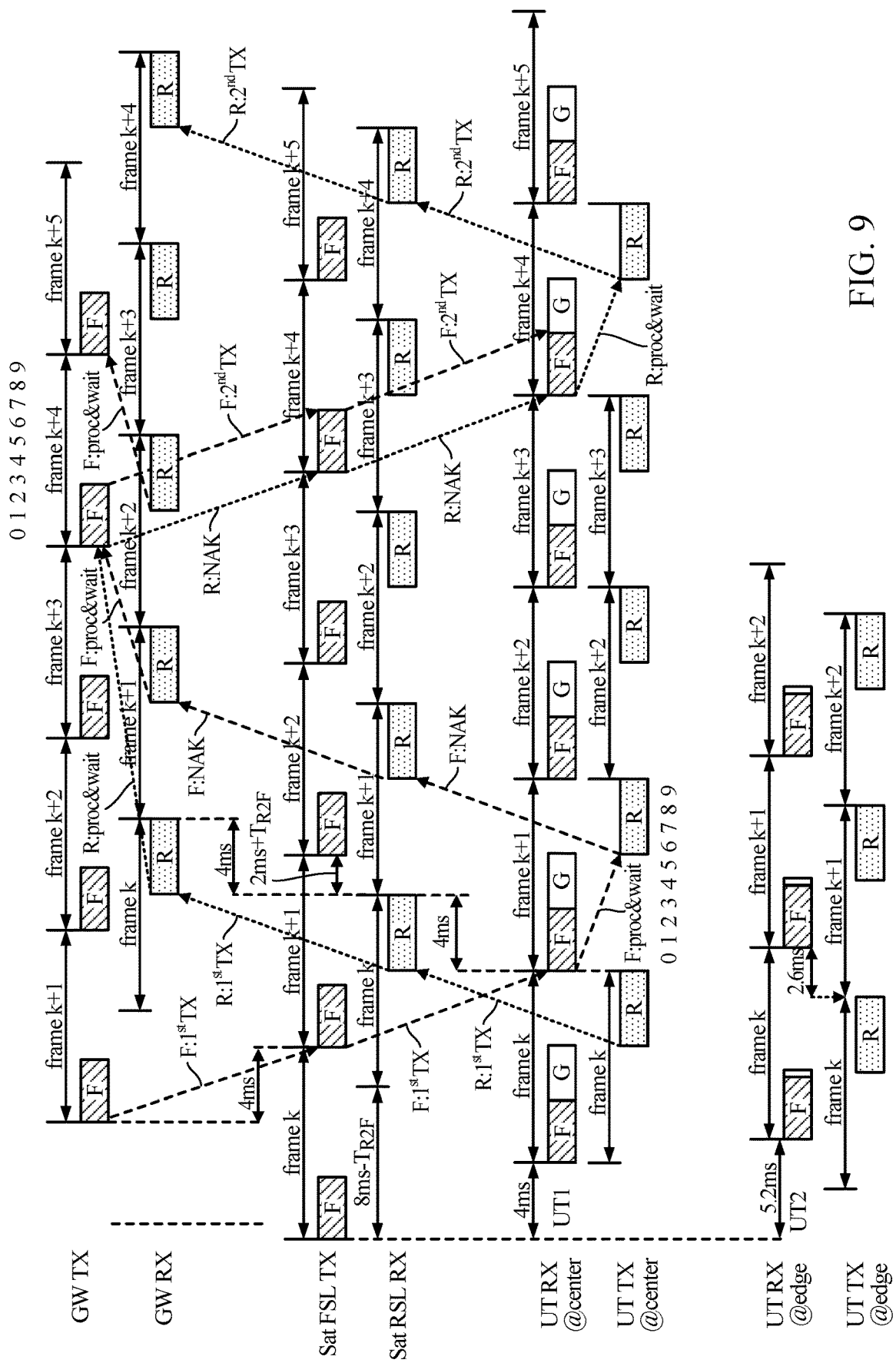
FIG. 9 is a diagram illustrating an example of an HARQ timeline with a feeder link delay of about 4 ms.

FIGS. 8 and 9 are diagrams illustrating examples of HARQ timelines with feeder link delays of about 9.2 ms and about 4 ms, respectively. Propagation delays of forward and return link signals between the satellite 300 and the gateway 200 are determined by the distance between the satellite 300 and the gateway 200. In the example illustrated in FIG. 8, the feeder link delay between the leading edge of subframe F of frame k of the gateway transmitter (GW TX) and the leading edge of subframe F of frame k+1 of the satellite FL transmitter (Sat FSL TX) is about 9.2 ms.

In the example illustrated in FIG. 8, it is assumed that the one-way propagation delay between the satellite 300 and the UT 400 and/or 401 at or near the center of a beam coverage is about 4 ms, and thus the leading edge of subframe F of frame k at the receiver of the UT 400 and/or 401 at or near the center of the beam coverage (UT RX @center) lags the leading edge of subframe F of frame k at Sat FSL TX by about 4 ms. In contrast, the one-way propagation delay between the satellite 300 and the UT 400 and/or 401 at or near the edge of the beam coverage of the satellite 300 is about 5.2 ms.

In the example shown in FIG. 8, a two-way communication timeline between the gateway 200 and the UT 400 and/or 401 at or near the center of a beam coverage of the satellite 300, which serves as a transponder, is illustrated. A timeline from the leading edge of subframe F of frame k at GW TX to the leading edge of subframe F of frame k+1 at Sat FSL TX is illustrated by a dashed line (F: $1^{st}$ TX), with a propagation time of about 9.2 ms, and a timeline from the leading edge of subframe F of frame k+1 at Sat FSL TX to the leading edge of subframe F of frame k+1 at UT RX @center is illustrated by a dashed line (F: $1^{st}$ TX), with a propagation time of about 4 ms.

At the UT 400 and/or 401, a process and wait time is provided, which illustrated by a dashed line (F: proc & wait). In frame k+1 at the UT 400 and/or 401, a guard time is provided in subframe G to separate the reception of the forward link signal at the UT in subframe F and the transmission of the return link signal at the UT 400 and/or 401 in subframe R. As shown in FIG. 8, the guard time in subframe G is part of the process and wait time to allow the UT 400 and/or 401 to process the signal or data before a subsequent transmission on the return link.

In the example shown in FIG. 8, a timeline illustrating a transmission initiated by the UT 400 and/or 401 at or near the center of a beam coverage is also shown as a dashed line (R: $1^{st}$ TX), from the leading edge of subframe R of frame k at the UT transmitter (UT TX @center) to the leading edge of subframe R of frame k+1 at the satellite RL receiver (Sat RSL RX). The satellite 300 relays the return link signal from the UT 400 and/or 401 to the gateway along a dashed line (R: $1^{st}$ TX), which leads from the leading edge of subframe R of frame k+1 at Sat RSL RX to the leading edge of subframe R of frame k+2 at the gateway receiver (GW RX). A process and wait time (R: proc & wait) may also be provided at the gateway 200 to allow the gateway 200 to process the signal or data before a subsequent transmission on the forward link.

In the example shown in FIG. 8, a non-acknowledgement (NAK) signal is transmitted from the UT 400 and/or 401 at or near the center of the beam coverage through the satellite 300 to the gateway 200, as illustrated by dashed lines (F: NAK) from the leading edge of subframe R of frame k+1 at UT TX @center to the leading edge of subframe R of frame k+2 at Sat RSL RX, and from the leading edge of subframe R of frame k+2 at Sat RSL RX to the leading edge of subframe R of frame k+3 at GW RX.

Likewise, another NAK signal is transmitted from the gateway 200 through the satellite 300 to the UT 400 and/or 401, as illustrated by dashed lines (R: NAK) from the leading edge of subframe F of frame k+3 at GW TX to the leading edge of subframe F of frame k+4 at Sat FSL TX, and from the leading edge of subframe F of frame k+4 at Sat FSL TX to the leading edge of subframe F of frame k+4 at UT RX @center. Instead of NAK, an acknowledgement (ACK) signal may be transmitted by the UT 400 and/or 401 in response to the received forward link signal, and similarly, an ACK signal may be transmitted by the gateway 200 in response to the received return link signal.

In the example shown in FIG. 8, it is assumed that there is a minimum round-trip propagation delay of about 8 ms between the satellite 300 and the UT 400 and/or 401. Thus a time delay of 8 ms-$T_{R2F}$ is provided between the time reference for the Sat RSL RX relative to the time reference for the Sat FSL TX, as shown by the time difference 8 ms-$T_{R2F}$ between the leading edge of frame k at Sat RSL RX and the leading edge of frame k at Sat FSL TX in FIG. 8.

In this example, $T_{R2F}$ is a system parameter which accounts for a transition time for the half-duplex UT transceiver to settle when it switches from the receive mode to the transmit mode or vice versa, for example, a 100 µs, plus a small margin for the transition time. In the example shown in FIG. 8, it is also assumed that the UT 400 and/or 401 needs a processing time of about 2 ms between receiving the forward link packet and transmitting the ACK or NAK response. The approximately 2 ms of processing time required by the UT 400 and/or 401 may be accounted for by providing a time gap of about 2 ms between the trailing edge of subframe R of frame k+1 at Sat RSL RX and the leading edge of subframe F of frame k+2 at Sat FSL TX, for example, as shown in FIG. 8.

The receive and transmit operations as well as the ACK/NAK responses of the UT 400 and/or 401 at or near the edge of a beam coverage (UT RX @edge and UT TX @edge) as shown in FIG. 8 are similar to the UT 400 and/or 401 at or near the center of the beam coverage (UT RX @center and UT TX @center). However, the leading edge of subframe F of frame k at UT RX @edge lags the leading edge of subframe F of frame k at Sat FSL TX by about 5.2 ms.

In this example, for the UT 400 and/or 401 at or near the edge of the beam coverage, a time gap of about 2.6 ms is provided between the trailing edge of subframe R of frame k at UT TX @edge and the leading edge of subframe F of the succeeding frame k+1 at UT RX @edge. To compensate for the time gap of about 2.6 ms between the two adjacent frames, the length of the guard time in subframe G between subframe F and subframe R in each of the HD frames in the UT 400 and/or 401 at or near the edge of beam coverage is reduced. In one aspect, the guard time in a given HD frame may be dynamically adjusted by implementing an adaptive special subframe (SSF), which will be described in further detail below.

FIG. 9 is a diagram illustrating an example of an HARQ timeline for a satellite communication system in which the feeder link delay between the gateway 200 and the satellite 300 is about 4 ms. In this example, there is a time gap of about 4 ms between the leading edge of subframe F of frame k+1 at GW TX and the leading edge of subframe F of frame k+1 at Sat FSL TX. In the example shown in FIG. 9, it is also assumed that there is a minimum round-trip propagation delay of about 8 ms between the satellite 300 and the UT 400 and/or 401, and that the UT 400 and/or 401 needs a processing time of about 2 ms between receiving the forward link packet and transmitting the ACK or NAK response.

Like the example shown in FIG. 8, a time delay of 8 ms-$T_{R2F}$ is provided between the time reference for the Sat RSL RX relative to the time reference for the Sat FSL TX, as shown by the time difference 8 ms-$T_{R2F}$ between the leading edge of frame k at Sat RSL RX and the leading edge of frame k at Sat FSL TX in FIG. 9, where $T_{R2F}$ is a system parameter that accounts for the transition time plus a margin for the half-duplex UT transceiver to settle when it transitions from the receive mode to the transmit mode or vice versa. Moreover, a time gap of about 2 ms plus $T_{R2F}$ may be provided between the trailing edge of subframe R of frame k+1 at Sat RSL RX and the leading edge of subframe F of frame k+2 at Sat FSL TX, for example, to account for the processing time required by the UT 400 and/or 401 to process a received packet and the transition time required by the half-duplex UT transceiver to settle between receive and transmit modes.

Based on the examples illustrated in FIGS. 8 and 9, it will be appreciated that the half-duplex frame patterns at the gateway 200, the satellite 300, and the UT 400 and/or 401 may be repeated for frames beyond those illustrated in FIGS. 8 and 9, for example, beyond frame k+4, k+5, . . . . In one aspect, the satellite FL transmit time reference at Sat FSL TX may be set as a zero offset time reference. In one aspect, the timelines for the gateway transmitter and receiver and for the UT transmitter and receiver may be derived based on the time delays of respective frames relative to the satellite FL transmit time reference. It will be appreciated that a zero offset time reference may be set in other manners to provide the desired relative time delays at the gateway 200 and at the UT 400 and/or 401.

In one aspect, an adaptive special subframe (SSF) is provided to allow for an increase or decrease in the total guard time with a corresponding decrease or increase in the total time allocated for the forward link within a given HD frame. In the example illustrated in FIGS. 6 and 7 and described above, the 10 ms HD frame consists of subframes F, S, G and R having lengths of 3 ms, 1 ms, 2 ms and 4 ms, respectively, and within special subframe S, a time segment is allocated for FL $F_{SSF}$ and another time segment is allocated for time $G_{SSF}$. Thus, the total amount of time for the FL within the 10 ms HD frame of FIG. 6 is 3 ms+0.2 ms=3.2 ms, whereas the total guard time within the 10 ms HD frame of FIG. 6 is 0.8 ms+2 ms=2.8 ms.

In one aspect, allocations between the amount of time for the FL $F_{SSF}$ and the amount of guard time $G_{SSF}$ within the SSF may be dynamically changed, depending on whether the UT 400 and/or 401 is at or near the center of a beam coverage of the satellite 300, that is, the where the round-trip propagation delay of signals between the satellite 300 and the UT 400 and/or 401 is at or near a minimum, or at or near the edge of the beam coverage of the satellite 300, that is, where the round-trip propagation delay of signals between the satellite 300 and the UT 400 and/or 401 is at or near a maximum. In one aspect, between the center and the edge of a beam coverage, there is a continuum of SSF configurations with varying allocations of amounts of time between $F_{SSF}$ and $G_{SSF}$, although the total amount of time for the SSF remains constant at 1 ms.

In one aspect, the amount of time allocated to $F_{SSF}$ may be increased or decreased in continuous or discrete increments or decrements, and the amount of time allocated to $G_{SSF}$ may be correspondingly decreased or increased in continuous or discrete decrements or increments, depending on the round-trip propagation delay between the UT 400 and/or 401 and the satellite 300, which is determined by the location of the UT 400 and/or 401 in the beam coverage. For example, in a 10 ms HD frame, for the UT 400 and/or 401 at the center of a beam coverage, that is, where the round-trip propagation delay is at a minimum, the entire length of SSF may be allocated to the FL, thus effectively resulting in an allocation of 4 ms, 2 ms, and 4 ms for the forward link, the guard time, and the return link, respectively.

On the other hand, for the UT 400 and/or 401 at the edge of a beam coverage, that is, where the round-trip propagation delay is at a maximum, 0.2 ms of the 1 ms SSF may be allocated to the FL while 0.8 ms of the 1 ms SSF may be allocated to the guard time, thus effectively resulting in an allocation of 3.2 ms, 2.8 ms, and 4 ms for the forward link, the guard time, and the return link, respectively, within the HD frame.

In one aspect, a scheduler may be provided to adaptively adjust the time allocations between $F_{SSF}$ and $G_{SSF}$ in an SSF, depending on the location of the UT 400 and/or 401 in a given beam coverage. In one aspect, the scheduler may be implemented in a processor as part of a gateway, for example, the gateway 200 as shown in FIG. 1, or as part of the infrastructure, for example, the infrastructure 106 as shown in FIG. 1.

In one aspect, the scheduler may adaptively adjust the SSF configuration by scheduling the proper amount of forward link traffic from the gateway 200 through the satellite 300 to the UT 400 and/or 401. In one aspect, the UT 400 and/or 401 only needs to follow the full-duplex frequency division duplex (FDD) timeline specification.

From the UT perspective, the UT 400 and/or 401 may be unaware of the HD frame pattern designed for half-duplex operations, but may be aware of its own half-duplex capability and may inform the scheduler in the network of its half-duplex capability through a message, for example, a UT capability message, over the return link. In one aspect, the UT 400 and/or 401 monitors every subframe as an FL subframe unless it is granted as an RL subframe. In one aspect, the UT 400 and/or 401 follows the scheduler grants for FL receptions and RL transmissions and follows the full-duplex FDD timeline specifications for HARQ and grants.

The scheduler may be implemented in the gateway 200 (e.g., scheduler 202) or the infrastructure 106. In one aspect, a half-duplex scheduler is required to follow the established FL and RL HARQ timing rules. In one aspect, the scheduler may follow a half-duplex pattern for a half-duplex UT, but it is not required to do so.

For example, for the UT 400 and/or 401 located at or near the center of a beam coverage, that is, where the round-trip propagation delay between the UT 400 and/or 401 and the satellite 300 is at or near a minimum, a time allocation of 4 ms, 2 ms, and 4 ms may be provided for forward link signal reception, guard time, and return link signal transmission, respectively, in a given HD frame. In this example, the UT 400 and/or 401 is able to achieve up to 40% beam capacity for the forward link and 40% beam capacity for the return link.

In one aspect, random offsets as described above may be provided by the scheduler if multiple UTs are present in a beam coverage. For example, as described above, for 10 ms HD frames, 10 offsets from 0 ms to 9 ms in 1 ms increments may be provided for the half-duplex pattern if a large number of active UTs, for example, more than 10 UTs, are present in a beam coverage. If the number of active UTs in a beam coverage is relatively small, for example, fewer than 10 UTs, then 5 offsets from 0 ms to 8 ms in 2 ms increments may be provided. Due to the expected randomness of locations of various UTs within a beam coverage over time, it is expected that an approximately equal number of UTs would be found in each of the offsets over time. In one aspect, the scheduler may implement the random offsets to ensure that the aggregate of patterns for all active UTs in a beam coverage have random offsets and to spread an approximately equal traffic load across all offsets.

Figure 10:
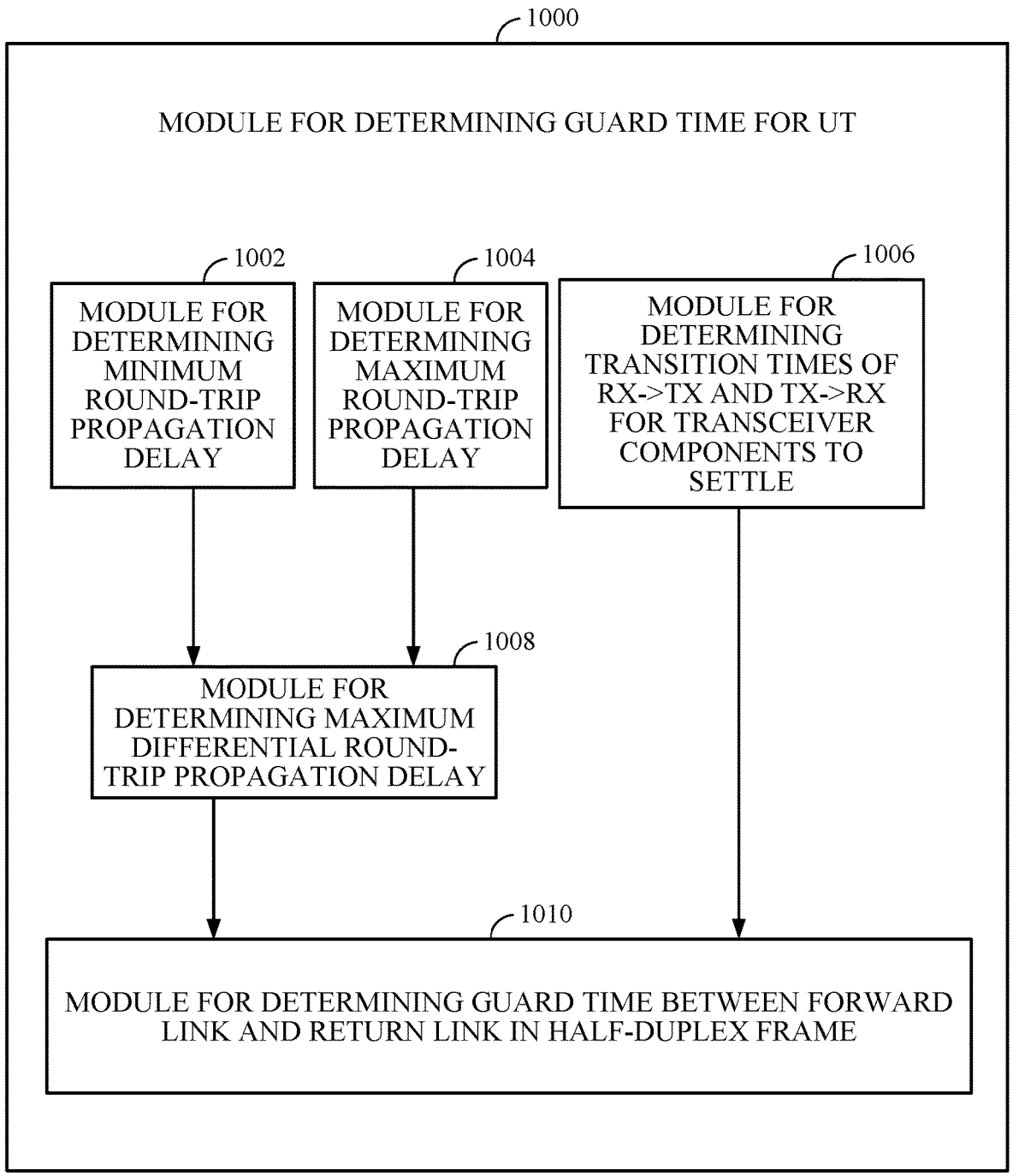
FIG. 10 is a block diagram illustrating an example of a module for determining the amount of guard time in an HD frame.

FIG. 10 is a block diagram illustrating an example of a module for determining the amount of guard time in a half-duplex frame in block 1000. In one aspect, a minimum round-trip propagation delay for a UT in a beam coverage of a satellite is determined in block 1002, and a maximum round-trip propagation delay for the UT is determined in block 1004. In one aspect, the minimum round-trip propagation delay is the round-trip delay of signal propagation when the UT is at the center of the beam coverage. In another aspect, the maximum round-trip propagation delay is the round-trip delay of signal propagation when the UT is at the edge of the beam coverage.

Referring to FIG. 10, based on the minimum round-trip propagation delay and the maximum round-trip propagation delay determined in blocks 1002 and 1004, respectively, a maximum differential round-trip propagation delay is determined in block 1008. In one aspect, the maximum differential round-trip propagation delay is determined by subtracting the minimum round-trip propagation delay from the maximum round-trip propagation delay.

The transition times for the circuit components of a half-duplex transceiver, such as a phase locked loop (PLL) or a power amplifier (PA), to settle when the transceiver switches from a receive mode to a transmit mode and vice versa, are determined in block 1006. In one aspect, margins may be included in the transition times for the half-duplex transceiver to switch from the receive mode to the transmit mode and vice versa. Based on the maximum differential round-trip propagation delay and the transition times for the transceiver to switch from the receive mode to the transmit mode and vice versa, the guard time between the forward link and the return link in the half-duplex frame at the UT is determined in block 1010. In one aspect, the guard time is determined by the sum of the maximum differential round-trip propagation delay, the transition time from the receive mode to the transmit mode, and the transition time from the transmit mode to the receive mode.

Figure 11:
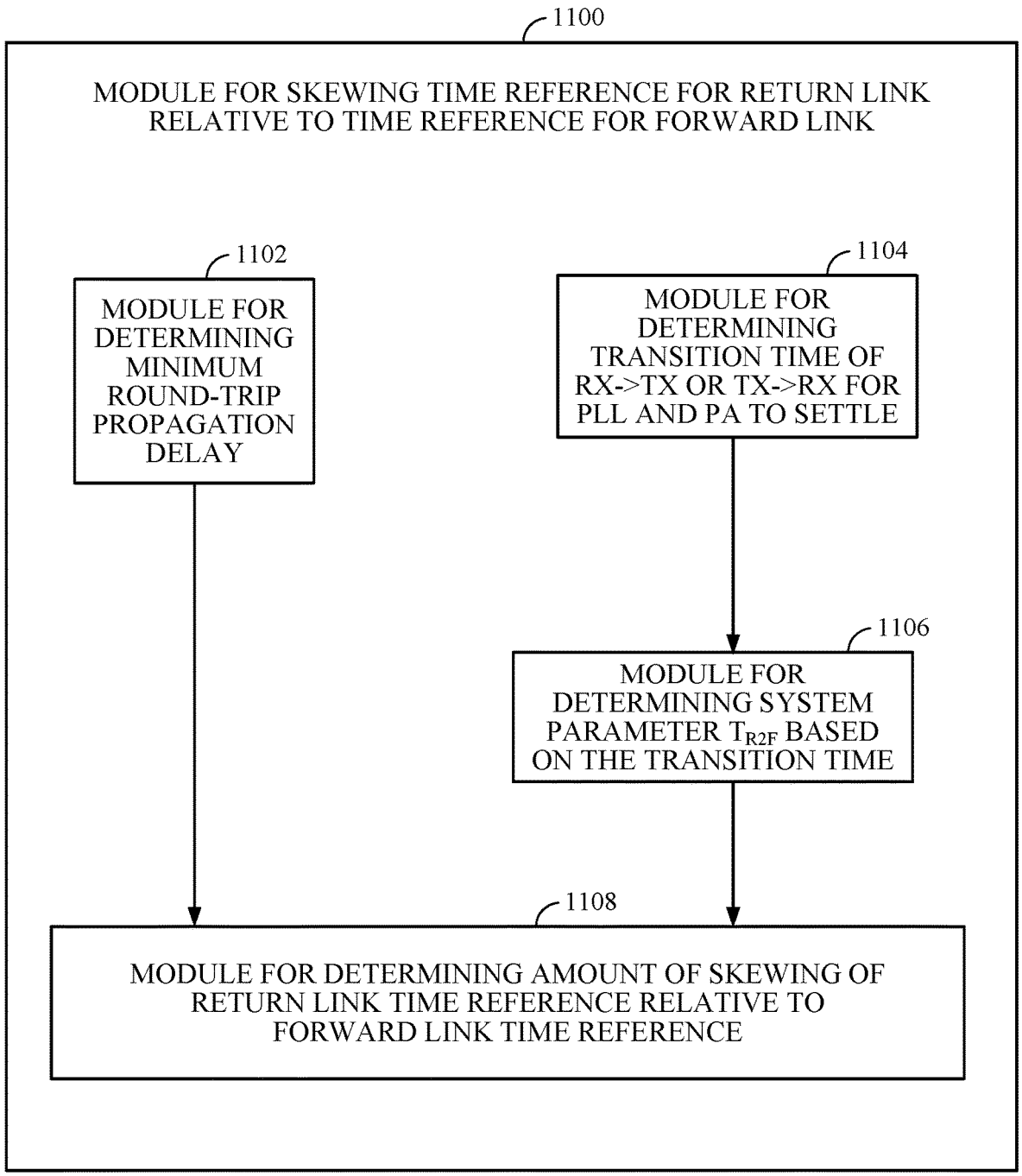
FIG. 11 is a block diagram illustrating an example of a module for skewing a time reference for a return link relative to a time reference for a forward link.

FIG. 11 is a block diagram illustrating an example of a module for skewing a time reference for a return link relative to a time reference for a forward link in block 1100. In one aspect, a minimum round-trip propagation delay is determined in block 1102, and a transition time for the circuit components of a half-duplex transceiver, including, for example, a PLL or PA, to settle when the transceiver switches from the transmit mode to the receive mode or vice versa, is determined in block 1104. As described above, in one aspect, the minimum round-trip propagation delay is the round-trip delay of signal propagation when a UT within a beam coverage of a satellite communicates with the satellite at the center of the beam coverage.

Referring to FIG. 11, a system parameter, $T_{R2F}$, is determined based on the transition time in block 1106. In one aspect, the system parameter $T_{R2F}$ may be determined by adding a margin to the transition time for the half-duplex transceiver to transition from the transmit mode to the receive mode or vice versa. Based on the minimum round-trip propagation delay and the system parameter $T_{R2F}$, the amount of skewing or time lag of the return link time reference relative to the forward link time reference is determined in block 1108.

In one aspect, the amount of skewing or time lag is determined by subtracting the system parameter $T_{R2F}$ from the minimum round-trip propagation delay. In one aspect, the forward link time reference at the satellite forward link transmitter may be set as a zero offset time reference, and the return link time reference at the satellite return link receiver may be skewed or delayed in time relative to the forward link time reference at the satellite forward link transmitter.

Figure 12:
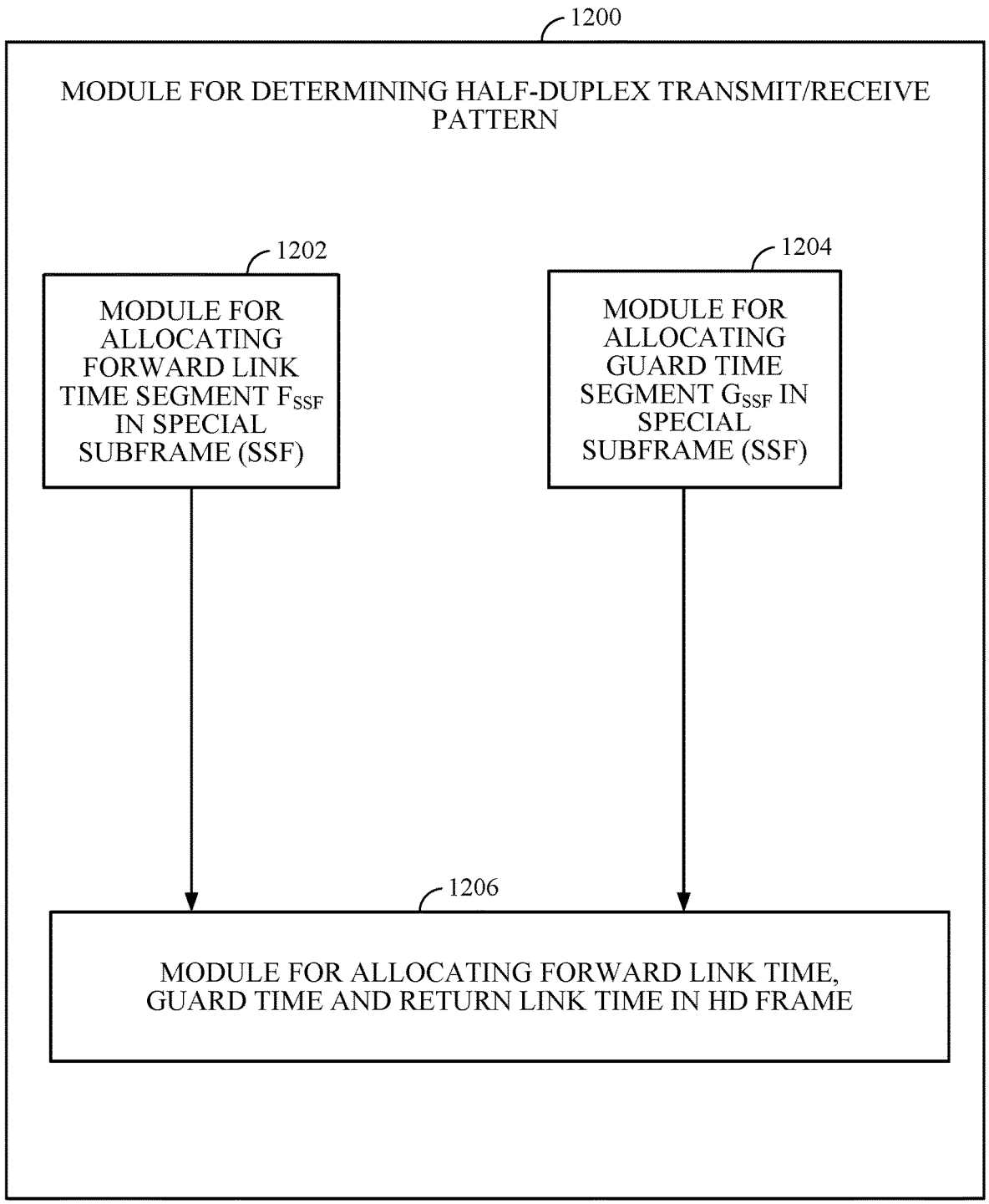
FIG. 12 is a block diagram illustrating an example of a module for determining a half-duplex transmit/receive pattern at a user terminal.

FIG. 12 is a block diagram illustrating an example of a module for determining a half-duplex transmit/receive pattern at a user terminal (UT) in block 1200. In one aspect, a forward link time segment $F_{SSF}$ in the special subframe (SSF) of the HD frame is allocated in block 1202, and a guard time segment $G_{SSF}$ in the SSF of the HD frame is allocated in block 1204. In one aspect described above, although the total length of the SSF remains constant at 1 ms in a 10 ms HD frame, the proportion of the forward link time segment $F_{SSF}$ and the proportion of the guard time segment $G_{SSF}$ within the SSF may be dynamically adjusted, based at least in part on the amount of total guard time required in the HD frame.

As illustrated in FIGS. 6 and 7 and described above, the forward link time segment $F_{SSF}$ in subframe S immediately follows subframe F in the HD frame, and the total time duration for forward link reception by the UT is the sum of the time duration for the subframe F and the time duration for $F_{SSF}$ in subframe S. Likewise, the guard time segment $G_{SSF}$ in subframe S immediately precedes subframe G in the HD frame, and the total time duration for the guard time is the sum of the time duration for the subframe G and the time duration for $G_{SSF}$ in subframe S. In the example illustrated in FIG. 6, time duration for subframe R for return link transmission by the UT remains constant at 4 ms. Referring to FIG. 12, the forward link time, the guard time, and the return link time in the HD frame are allocated in block 1206.

Figure 13:
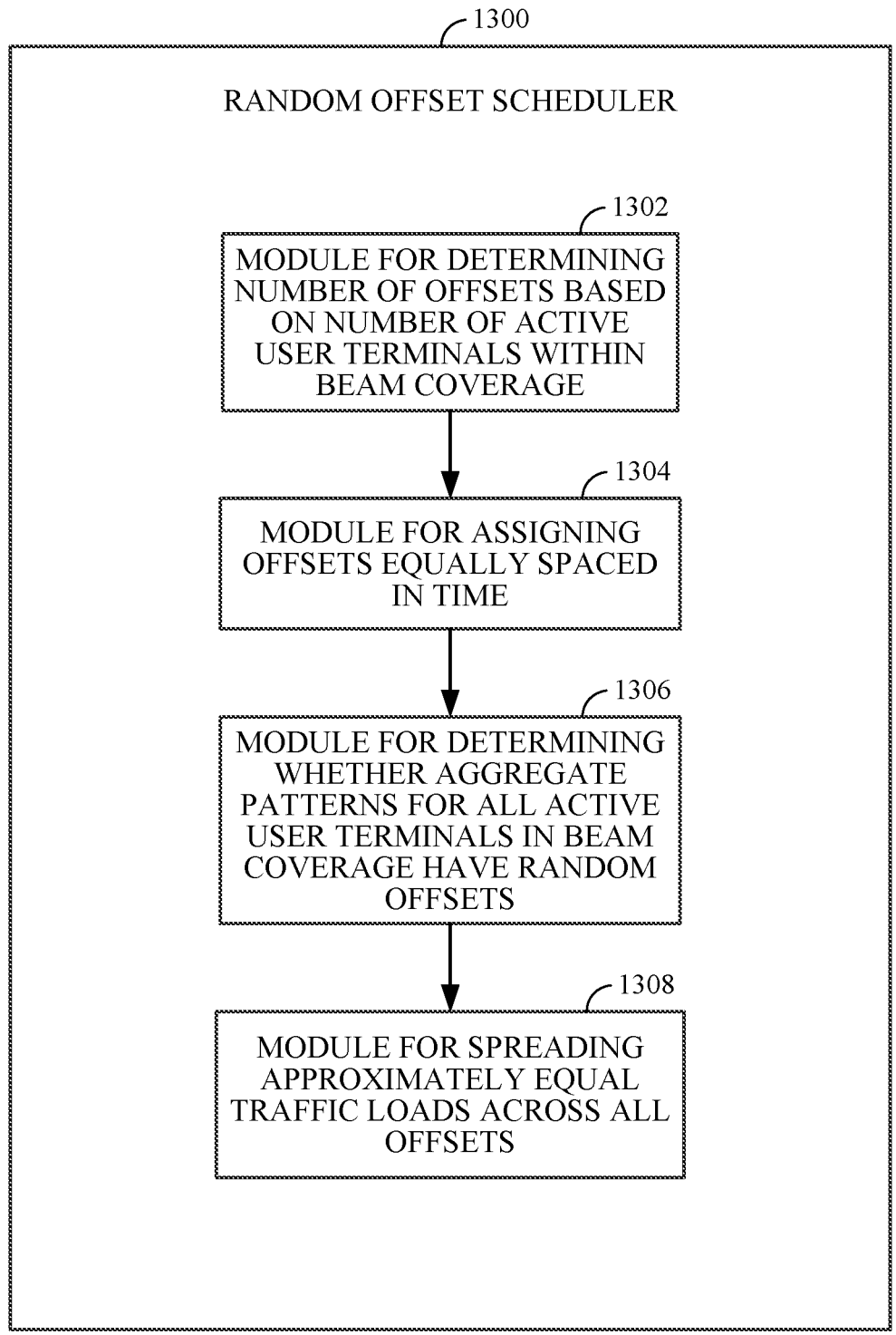
FIG. 13 is a block diagram illustrating an example of a random offset scheduler.

FIG. 13 is a block diagram illustrating an example of a random offset scheduler 1300. In one aspect, a number of offsets based on the number of active UTs found within a beam coverage of a satellite is determined by a module in block 1302. In one aspect, the offsets are assigned with equal spacings in time by a module in block 1304. If the number of active UTs within the beam coverage is large, for example, more than 10 UTs, and the length of the HD frame is 10 ms, then 10 offsets may be provided in 1 ms increments, from 0 ms to 9 ms, as described above. If there are fewer than 10 active UTs, for example, a smaller number of offsets may be provided, for example, 5 offsets in 2 ms increments from 0 ms to 8 ms, as described above.

In one aspect, the random offset scheduler 1300 may be implemented in a gateway, such as the gateway 200 as shown in FIG. 1, or in the infrastructure, such as the infrastructure 106 as shown in FIG. 1. In one aspect, it is not necessary for a UT in a beam coverage of a satellite to be aware of the presence of the random offset scheduler 1300 in the gateway 200 or the infrastructure 106. The UT only needs to apply the time offset determined for that particular UT by the random offset scheduler 1300. Referring to FIG. 13, the random offset scheduler 1300 includes a module in block 1306 to determine whether aggregate patterns for all active UTs within the beam coverage have random offsets.

Based on the determination of aggregate patterns, a module in block 1308 of the random offset scheduler 1300 spreads approximately equal traffic loads across all the offsets.

Figure 14:
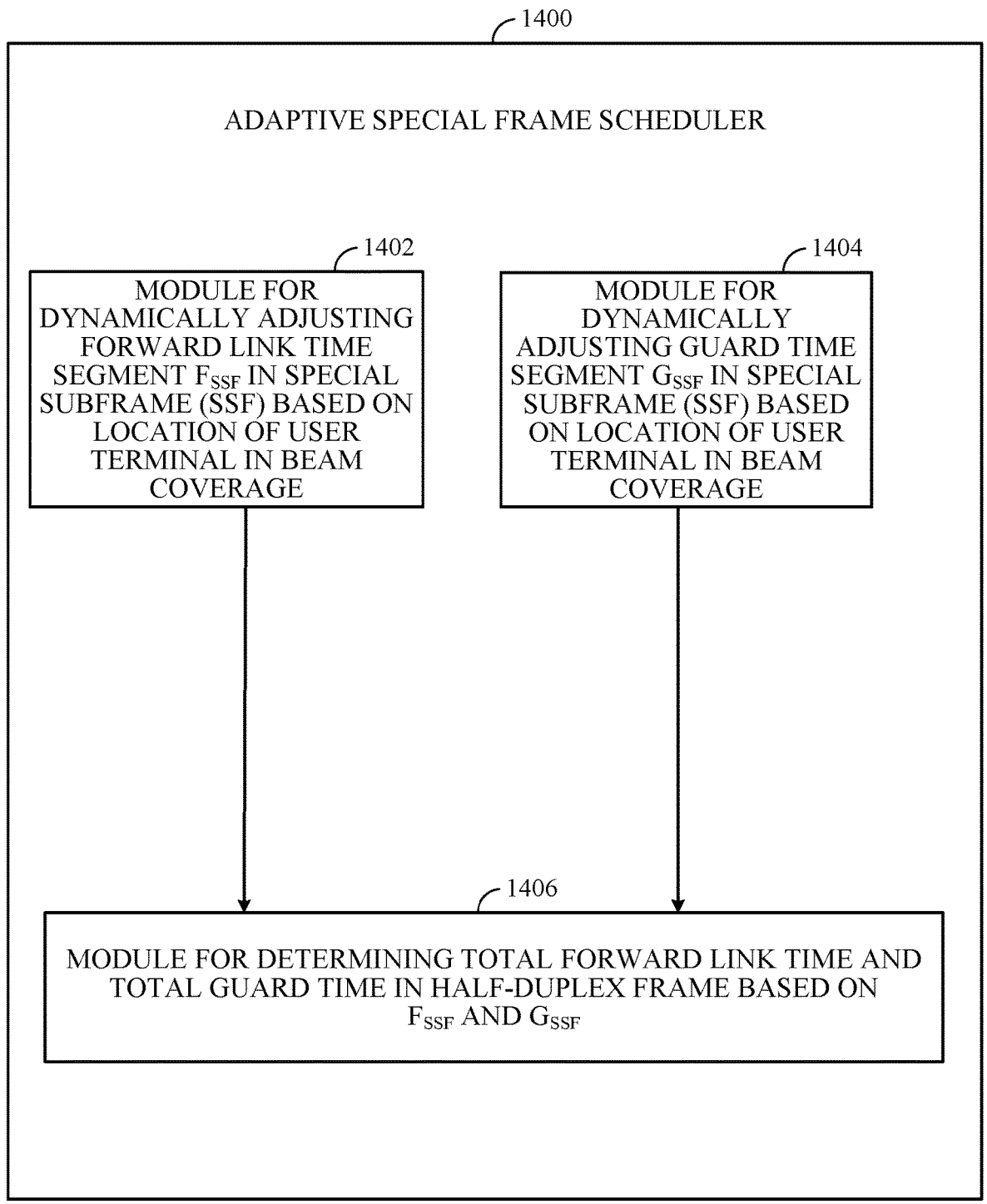
FIG. 14 is a block diagram illustrating an example of an adaptive SSF scheduler.

FIG. 14 is a block diagram illustrating an example of an adaptive special frame (SSF) scheduler in block 1400. In one aspect, the adaptive SSF scheduler 1400 may be implemented in a gateway, such as the gateway 200 as shown in FIG. 1, or in the infrastructure, such as the infrastructure 106 as shown in FIG. 1. In one aspect, it is not necessary for a UT in a beam coverage of a satellite to be aware of the presence of the adaptive SSF scheduler 1400 in the gateway 200 or the infrastructure 106.

Referring to FIG. 14, a module in block 1402 of the adaptive SSF scheduler 1400 dynamically adjusts the forward link time segment $F_{SSF}$ based on the location of the UT relative to the satellite, which determines the distance between the UT and the satellite and thus the propagation delay. In one aspect, the adaptive SSF scheduler 1400 also includes a module in block 1404 to adjust the guard time segment $G_{SSF}$ in the adaptive SSF scheduler 1400 based on the location of the UT in the beam coverage of the satellite.

In one aspect, because the total length of the adaptive SSF scheduler 1400 remains constant, an increase in the guard time segment $G_{SSF}$ necessitates a decrease in the forward link time segment $F_{SSF}$ and vice versa. Based on the dynamically adjusted $F_{SSF}$ and $G_{SSF}$, the total time for forward link reception and the total guard time between forward link reception and return link transmission within an HD frame for the UT are determined by a module in block 1406. In one aspect, the total time for forward link reception is determined by adding the length of time of $F_{SSF}$ to the length of time of the forward link subframe F in the HD frame as shown in FIG. 6, whereas the total guard time is determined by adding the length of time of $G_{SSF}$ to the length of time of the guard subframe G in the HD frame as shown in FIG. 6.

The functionality of the modules of FIGS. 10-14 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module. Further, it will be appreciated that modules and functionality described herein may be implemented in one or more elements (e.g., gateway, infrastructure, satellite, and/or UT) of the satellite communication system. For example, in some aspects, the functionality may be shared between multiple elements of the satellite communication system (e.g., gateway and infrastructure) that are in communication with each other. Accordingly, the illustrations provided herein are merely examples.

In addition, the components and functions represented by FIGS. 10-14, as well as other components and functions described herein, may be implemented using any suitable means. Such means also may be implemented, at least in part, using corresponding structure as taught herein. For example, the components described above in conjunction with the "module for" components of FIGS. 10-14 also may correspond to similarly designated "means for" functionality. Thus, in some aspects one or more of such means may be implemented using one or more of processor components, integrated circuits, or other suitable structure as taught herein.

Figure 15:
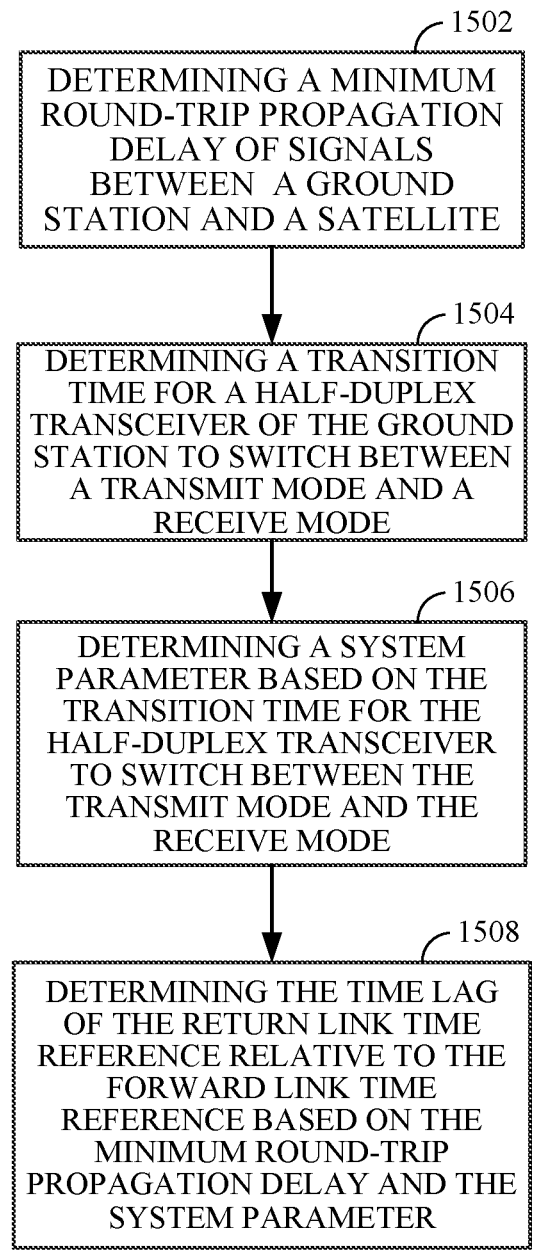
FIG. 15 is a flowchart illustrating a method of determining a time lag of a return link time reference relative to a forward link time reference in a satellite communication system.

In view of the foregoing disclosure, it will be appreciated that several aspects can support methods for performing the various functions disclosed herein. For example, FIG. 15 is a flowchart illustrating a method of determining a time lag of a return link time reference relative to a forward link time reference in a satellite communication system. In block 1502, a minimum round-trip propagation delay of signals between a ground station and a satellite is determined. In block 1504, a transition time for a half-duplex transceiver of the ground station to switch between a transmit mode and a receive mode is determined. In block 1506, a system parameter is determined based on the transition time for the half-duplex transceiver to switch between the transmit mode and the receive mode. In block 1508, the time lag of the return link time reference relative to the forward link time reference is determined based on the minimum round-trip propagation delay and the system parameter. The method may be performed in a satellite communication system 100, as illustrated in FIG. 1. The satellite communication system 100 can include satellite 300 and at least one ground station (e.g., UT 400, UT 401) having a half-duplex transceiver in a beam coverage of the satellite 300.

Figure 16:
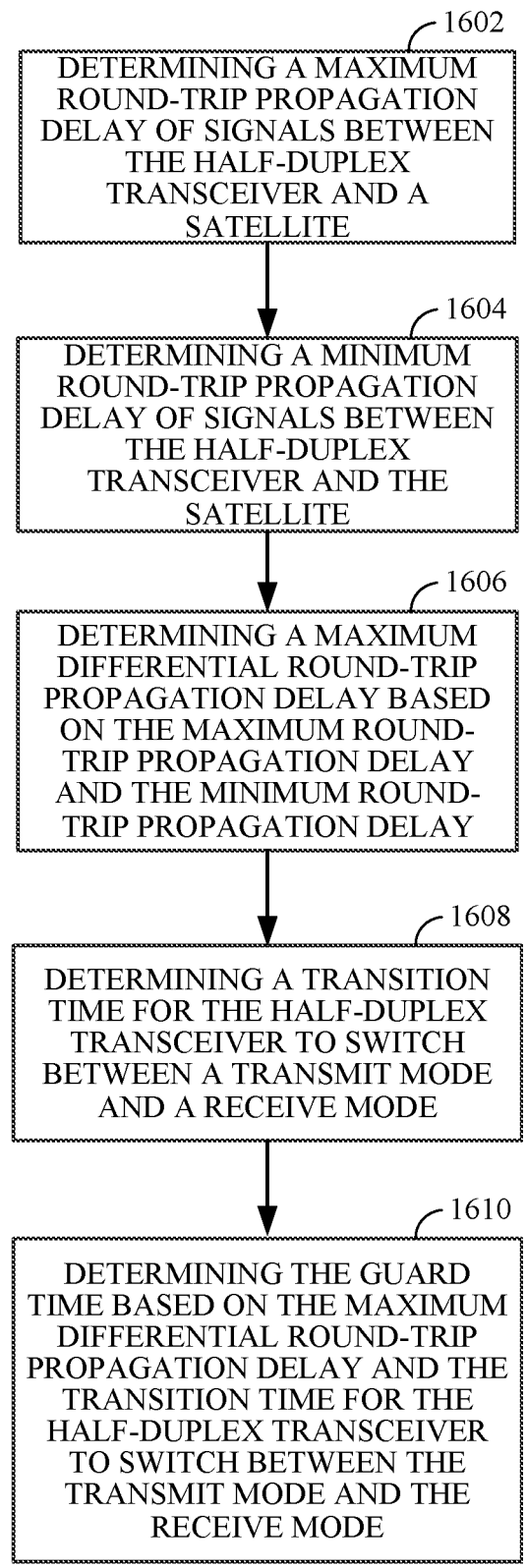
FIG. 16 is a flowchart illustrating a method of determining a guard time between reception and transmission in a half-duplex transceiver.

In another aspect, FIG. 16 is a flowchart illustrating a method of determining a guard time between reception and transmission in a half-duplex transceiver. In block 1602, a maximum round-trip propagation delay of signals between the half-duplex transceiver and a satellite is determined. In block 1604, a minimum round-trip propagation delay of signals between the half-duplex transceiver and the satellite is determined. In block 1606, a maximum differential round-trip propagation delay is determined based on the maximum round-trip propagation delay and the minimum round-trip propagation delay. In block 1608, a transition time for the half-duplex transceiver to switch between a transmit mode and a receive mode is determined. In block 1610, the guard time is determined based on the maximum differential round-trip propagation delay and the transition time for the half-duplex transceiver to switch between the transmit mode and the receive mode. The method may be performed in a satellite communication system 100, as illustrated in FIG. 1. The satellite communication system 100 can include satellite 300 and at least one ground station (e.g., UT 400, UT 401) having a half-duplex transceiver in a beam coverage of the satellite 300.

Figure 17:
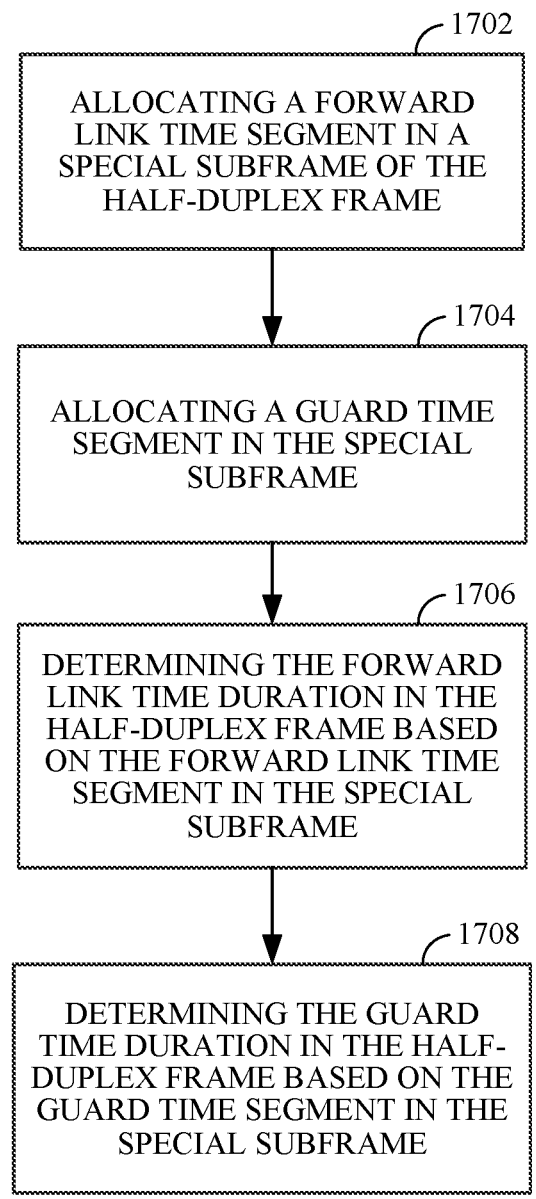
FIG. 17 is a flowchart illustrating of a method of determining a forward link time duration and a guard time duration in a half-duplex frame in a satellite communication system.

In another aspect, FIG. 17 is a flowchart illustrating of a method of determining a forward link time duration and a guard time duration in a half-duplex frame in a satellite communication system. In block 1702, a forward link time segment is allocated in a special subframe of the half-duplex frame. In block 1704, a guard time segment is allocated in the special subframe. In block 1706, the forward link time duration in the half-duplex frame is determined based on the forward link time segment in the special subframe. In block 1708, the guard time duration in the half-duplex frame is determined based on the guard time segment in the special subframe. The method may be performed in a satellite communication system 100, as illustrated in FIG. 1. The satellite communication system 100 can include a gateway 200 having a scheduler 202, satellite 300 and at least one ground station (e.g., UT 400, UT 401) having a half-duplex transceiver in a beam coverage of the satellite 300.

Figure 18:
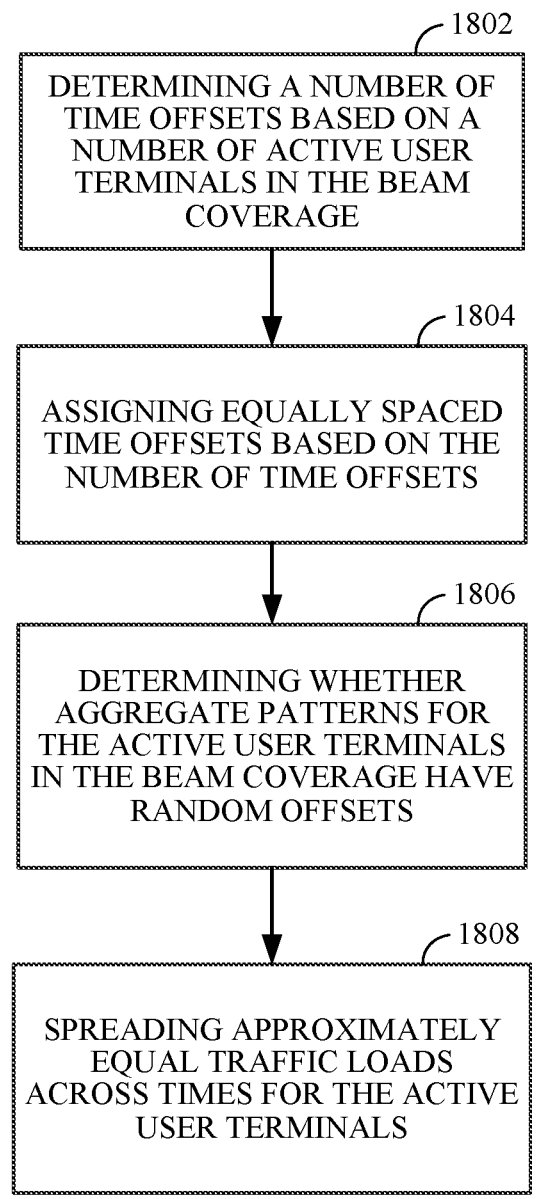
FIG. 18 is a flowchart illustrating a method of scheduling time offsets of a plurality of user terminals in a beam coverage of a satellite in a satellite communication system.

In another, FIG. 18 is a flowchart illustrating a method of scheduling time offsets of a plurality of user terminals in a beam coverage of a satellite in a satellite communication system. In block 1802, a number of time offsets is determined based on a number of active user terminals in the beam coverage. In block 1804, equally spaced time offsets are assigned based on the number of time offsets. In block 1806, it is determined whether aggregate patterns for the active user terminals in the beam coverage have random offsets. In block 1806, approximately equal traffic loads are spread across times for the active user terminals. The method may be performed in a satellite communication system 100, as illustrated in FIG. 1. The satellite communication system 100 can include a gateway 200 having a scheduler 202, satellite 300 and a plurality of user terminals (e.g., UT 400, UT 401) in a beam coverage of the satellite 300.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

Accordingly, one aspect of the disclosure can include a computer-readable medium embodying one or more methods disclosed herein related to data transmissions in half-duplex in non-geosynchronous satellite communication systems. Accordingly, the disclosure is not limited to illustrated examples and any means for performing the functionality described herein are included in aspects of the disclosure.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of determining a time lag of a return link time reference relative to a forward link time reference in a satellite communication system, the method comprising:
   determining a minimum round-trip propagation delay of signals between a ground station and a satellite;
   determining a transition time for a half-duplex transceiver of the ground station to switch between a transmit mode and a receive mode;
   determining a system parameter based on the transition time for the half-duplex transceiver to switch between the transmit mode and the receive mode;
   determining the time lag of the return link time reference relative to the forward link time reference by offsetting the system parameter from the minimum round-trip propagation delay; and
   scheduling at least one of one or more transmission operations by the satellite or one or more reception operations by the satellite in accordance with the determined time lag,
   wherein the scheduling schedules the one or more transmission operations by the satellite on a first of n+k frames and the scheduling schedules the one or more reception operations by the satellite on a second set of n+k frames, where n is greater than or equal to zero,
   wherein a leading edge of a frame k in the second set of n+k frames is skewed by the determined time lag at the satellite from a leading edge of a frame k in the first set of n+k frames,
   wherein the return link time reference is a return link receiver time reference of the satellite, and
   wherein the forward link time reference is a forward link transmitter time reference of the satellite.

2. The method of claim 1, further comprising determining a guard time between reception and transmission in the half-duplex transceiver.

3. The method of claim 2, wherein determining the guard time between reception and transmission in the half-duplex transceiver comprises:
   determining a maximum round-trip propagation delay of signals between the ground station and the satellite;
   determining a maximum differential round-trip propagation delay based on the maximum round-trip propagation delay and the minimum round-trip propagation delay; and
   determining the guard time based on the maximum differential round-trip propagation delay and the transition time for the half-duplex transceiver to switch between the transmit mode and the receive mode.

4. The method of claim 1, wherein the ground station comprises a user terminal.

5. The method of claim 1, wherein the satellite comprises a non-geosynchronous satellite.

6. An apparatus configured to determine a time lag of a return link time reference relative to a forward link time reference in a satellite communication system, the apparatus comprising:
   at least one processor; and
   at least one memory coupled to the at least one processor, the at least one processor and the at least one memory being configured to:
   determine a minimum round-trip propagation delay of signals between a ground station and a satellite;
   determine a transition time for a half-duplex transceiver of the ground station to switch between a transmit mode and a receive mode;
   determine a system parameter based on the transition time for the half-duplex transceiver to switch between the transmit mode and the receive mode;
   determine the time lag of the return link time reference relative to the forward link time reference by offsetting the system parameter from the minimum round-trip propagation delay; and
   schedule at least one of one or more transmission operations by the satellite or one or more reception operations by the satellite in accordance with the determined time lag,
   wherein the at least one processor schedules the one or more transmission operations by the satellite on a first of n+k frames and the at least one processor schedules the one or more reception operations by the satellite on a second set of n+k frames, where n is greater than or equal to zero,
   wherein a leading edge of a frame k in the second set of n+k frames is skewed by the determined time lag at the satellite from a leading edge of a frame k in the first set of n+k frames,
   wherein the return link time reference is a return link receiver time reference of the satellite, and
   wherein the forward link time reference is a forward link transmitter time reference of the satellite.

7. An apparatus for determining a time lag of a return link time reference relative to a forward link time reference in a satellite communication system, the apparatus comprising:
   means for determining a minimum round-trip propagation delay of signals between a ground station and a satellite;
   means for determining a transition time for a half-duplex transceiver at the ground station to switch between a transmit mode and a receive mode;
   means for determining a system parameter based on the transition time for the half-duplex transceiver to switch between the transmit mode and the receive mode;
   means for determining the time lag of the return link time reference relative to the forward link time reference by offsetting the system parameter from the minimum round-trip propagation delay; and
   means for scheduling at least one of one or more transmission operations by the satellite or one or more reception operations by the satellite in accordance with the determined time lag,
   wherein the means for scheduling schedules the one or more transmission operations by the satellite on a first of n+k frames and the means for scheduling schedules the one or more reception operations by the satellite on a second set of n+k frames, where n is greater than or equal to zero,
   wherein a leading edge of a frame k in the second set of n+k frames is skewed by the determined time lag at the satellite from a leading edge of a frame k in the first set of n+k frames,
   wherein the return link time reference is a return link receiver time reference of the satellite, and
   wherein the forward link time reference is a forward link transmitter time reference of the satellite.

8. A non-transitory computer-readable medium comprising at least one instruction for causing a computer or processor to perform a method to determine a time lag of a return link time reference relative to a forward link time reference in a satellite communication system, the at least one instruction comprising instructions to:
- determine a minimum round-trip propagation delay of signals between a ground station and a satellite;
- determine a transition time for a half-duplex transceiver of the ground station to switch between a transmit mode and a receive mode;
- determine a system parameter based on the transition time for the half-duplex transceiver to switch between the transmit mode and the receive mode;
- determine the time lag of the return link time reference relative to the forward link time reference by offsetting the system parameter from the minimum round-trip propagation delay; and
- schedule at least one of one or more transmission operations by the satellite or one or more reception operations by the satellite in accordance with the determined time lag,
- wherein the one or more transmission operations by the satellite are scheduled on a first of n+k frames and the one or more reception operations by the satellite are scheduled on a second set of n+k frames, where n is greater than or equal to zero,
- wherein a leading edge of a frame k in the second set of n+k frames is skewed by the determined time lag at the satellite from a leading edge of a frame k in the first set of n+k frames,
- wherein the return link time reference is a return link receiver time reference of the satellite, and
- wherein the forward link time reference is a forward link transmitter time reference of the satellite.

9. A method of determining a time lag of a return link time reference relative to a forward link time reference in a satellite communication system, the method comprising:
- determining a minimum round-trip propagation delay of signals between a ground station and a satellite;
- determining a transition time for a half-duplex transceiver of the ground station to switch between a transmit mode and a receive mode;
- determining a system parameter based on the transition time for the half-duplex transceiver to switch between the transmit mode and the receive mode;
- determining the time lag of the return link time reference relative to the forward link time reference by offsetting the system parameter from the minimum round-trip propagation delay; and
- scheduling at least one of one or more transmission operations by the satellite or one or more reception operations by the satellite in accordance with the determined time lag,
- wherein the scheduling schedules the one or more transmission operations by the satellite on a first of n+k frames and the scheduling schedules the one or more reception operations by the satellite on a second set of n+k frames, where n is greater than or equal to zero,
- wherein a leading edge of a frame k in the second set of n+k frames is skewed by the determined time lag at the satellite from a leading edge of a frame k in the first set of n+k frames,
- wherein the return link time reference is a return link receiver time reference of the satellite, and
- wherein the forward link time reference is a forward link transmitter time reference of the satellite.

* * * * *